(12) United States Patent
Maclean et al.

(10) Patent No.: US 9,016,623 B2
(45) Date of Patent: Apr. 28, 2015

(54) JAM PROTECTION AND ALLEVIATION FOR CONTROL SURFACE LINKAGE MECHANISMS

(75) Inventors: Robert D. Maclean, Bellevue, WA (US); Jan A. Kordel, Redmond, WA (US); Warren H. Steyaert, Woodinville, WA (US); David D. Boes, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 539 days.

(21) Appl. No.: 13/308,019

(22) Filed: Nov. 30, 2011

(65) Prior Publication Data

US 2013/0134262 A1 May 30, 2013

(51) Int. Cl.
*B64C 9/02* (2006.01)
*B64C 9/16* (2006.01)

(52) U.S. Cl.
CPC .... *B64C 9/02* (2013.01); *B64C 9/16* (2013.01)

(58) Field of Classification Search
USPC .............................. 244/99.3, 99.4, 99.9, 99.2
See application file for complete search history.

(56) References Cited

U.S. PATENT DOCUMENTS

| | | | | |
|---|---|---|---|---|
| 1,718,270 A * | 6/1929 | Wyman | ............................ | 292/44 |
| 2,423,984 A * | 7/1947 | Knoll | ............................ | 244/216 |
| 3,085,398 A * | 4/1963 | Ingleson | ....................... | 415/127 |
| 3,613,217 A * | 10/1971 | Perkins | ......................... | 29/432.2 |
| 4,856,379 A * | 8/1989 | Jafarey | ............................ | 475/176 |
| 5,518,466 A * | 5/1996 | Tiedeman | ..................... | 475/342 |
| 7,093,996 B2 * | 8/2006 | Wallace et al. | .................. | 403/78 |
| 7,251,866 B2 * | 8/2007 | Himi | ................................ | 24/435 |
| 7,475,854 B2 * | 1/2009 | Lacy et al. | ..................... | 244/215 |
| 7,766,282 B2 * | 8/2010 | Kordel et al. | .................. | 244/215 |
| 2004/0216461 A1* | 11/2004 | Wallace et al. | .................. | 60/772 |
| 2005/0132542 A1* | 6/2005 | Himi | ................................ | 24/436 |
| 2009/0146016 A1* | 6/2009 | Kordel et al. | .................. | 244/215 |
| 2011/0042525 A1* | 2/2011 | Parker | ........................... | 244/213 |

FOREIGN PATENT DOCUMENTS

WO     89/02851 A1    4/1989

OTHER PUBLICATIONS

International Search Report and Written Opinion, International Application No. PCT/US2012/052624 (foreign counterpart to the instant U.S. patent application, dated Oct. 10, 2014.

* cited by examiner

*Primary Examiner* — Tien Dinh
*Assistant Examiner* — Steven Hawk
(74) *Attorney, Agent, or Firm* — Ostrager Chong Flaherty & Broitman P.C.

(57) ABSTRACT

A flaperon mechanism that provides jam protection while preventing the component departing from the airplane or causing unacceptable collateral damage. The jam protection feature comprises a controlled failure (fused) mechanism that is associated with the flaperon and flaperon hinge panel and maintains functional movement of the devices. Additional features can be added to the mechanism to block, shield, allow runout and shed other obstruction avenues.

20 Claims, 16 Drawing Sheets

JAM PROTECTION AND ALLEVIATION FOR CONTROL SURFACE LINKAGE MECHANISMS

BACKGROUND

This disclosure generally relates to actuators for flight control surfaces and, in particular, relates to jam-tolerant systems for actuating flight control surfaces.

Deployable leading and trailing edge devices have been used for many years to control the attitude and lift/drag characteristics of modern aircraft. In particular, conventional trailing edge ailerons located on left and right aircraft wings are deployed asymmetrically to roll the aircraft. Trailing edge flaps are generally deployed symmetrically to create high-lift wing configurations suitable for landing and take-off. The flaps are then stowed for more efficient operation at cruise conditions. Conventional trailing edge devices typically include flaps, ailerons, or flaperons that are hinged relative to the wing, and are driven between stowed and deployed positions by one or more actuators.

Movement of aircraft control-surface components is crucial in flight, whereby an actuating assembly must consistently and dependably perform during normal operation. In particular, it is desirable that a flight control surface continue to be deployable even if the actuator assembly becomes jammed due to an obstruction. The definition of jam tolerance encompasses the ability of an actuator, or an actuator system, to permit continued input drive capabilities in the event of a jam in the actuator, or one or more of the actuators in an actuator system, respectively, resulting from an obstruction or internal actuator failure. In the context of the aerospace industry, such a jam-tolerant feature permits continued aircraft control flap movement in the event of a jam in one or more of the actuators in an actuator system.

Regulations require that an airplane be shown by analysis, tests, or both, to be capable of continued safe flight and landing after any one of a number failures or jamming in the flight control system and surfaces (including trim, lift, drag, and feel systems), within the normal flight envelope, without requiring exceptional piloting skill or strength. Any jam in a control position normally encountered during takeoff, climb, cruise, normal turns, descent, and landing must be accounted for. In particular, the aircraft cannot have an undetected failure in a control surface prior to the next flight, loose functionality, departure of a component from the airplane, or collateral damage locally or downstream.

A known flaperon assembly (see, e.g., U.S. Pat. No. 7,766,282) comprises a flaperon linked by linkage mechanisms to a wing and a rigid panel coupled by hinges to the wing and linked to the linkage mechanisms for coordinated panel rotation and flaperon movement. The flaperon assembly further comprises a pair of unitary cam track assemblies attached to the wing by respective brackets, each cam track assembly comprising a pair of cam surfaces (a.k.a. "cam tracks"). One cam surface is a failsafe feature which provides redundancy for the flaperon and does not carry any flight or system-generated loads. The other cam surface provides the program position for the rigid hinged panel. Due to linkage mechanism movement and the trapped programming tracks (i.e., cam surfaces) in this type of flaperon assembly, it is possible for an obstruction to occur. The obstruction can occur within the mechanism movement, in the cam track or surface, or in a pinching jam between moving and stationary parts.

There is a need to relieve or prevent the obstruction without jeopardizing the functionality of the linkage mechanisms, thereby avoiding unacceptable collateral damage and parts departing the airplane. In addition, the damage resulting from the obstruction must allow the mechanism to be functional without further degradation until planned maintenance inspection.

SUMMARY

The embodiments disclosed herein relate to control surface actuation mechanisms that provide jam protection while maintaining functionality and preventing components departing from an airplane wing or causing unacceptable collateral damage. The technical features disclosed herein have wide application to different types of flight control surfaces and are not limited in application to rotatable leading edge subassemblies, one slaved to the other. For example, the mechanism can be used on any dependent secondary surface deployment such as a Krueger flap on a leading edge or for any surface that is driven from another primary driven surface. The mechanism disclosed herein is also applicable to leading and trailing edges of different types of airfoil-shaped bodies, including wings. The mechanism also has application in folding gear doors and other structures in which two subassemblies, one driven and one slaved, need to be deployed at different rates of motion.

In accordance with various aspects, one or more of the following jam protection or alleviation features may be incorporated in a drive linkage which links first and second rotatable subassemblies so that rotation of the first rotatable subassembly drives rotation of the second rotatable subassembly: (1) structural fusing mechanisms with redundancy to allow complete movement/functionality upon a relieving failure; (2) relief caused by an obstruction manifesting as a scissor jam; (3) trapped obstruction in a cam surface; (4) runout clearance provided in a trapped cam surface to allow rollers to push an obstruction to the end of the cam surface; (5) shielded linkage to rollers to prevent a pinch jam between the linkage and the roller; (6) detailed features in the mechanism and cam surface to allow obstructions to fall away instead of jamming; and (7) a cam surface shroud to prevent an object from interfering between the external cam surface and a clevis joint containing a failsafe bearing.

Other aspects are disclosed and claimed below.

BRIEF DESCRIPTION OF THE DRAWINGS

Various embodiments will be hereinafter described with reference to drawings for the purpose of illustrating the foregoing and other aspects of the invention.

Reference will hereinafter be made to the drawings in which similar elements in different drawings bear the same reference numerals.

DETAILED DESCRIPTION

Although embodiments are disclosed in detail below, various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiments disclosed hereinafter.

Figure 1:
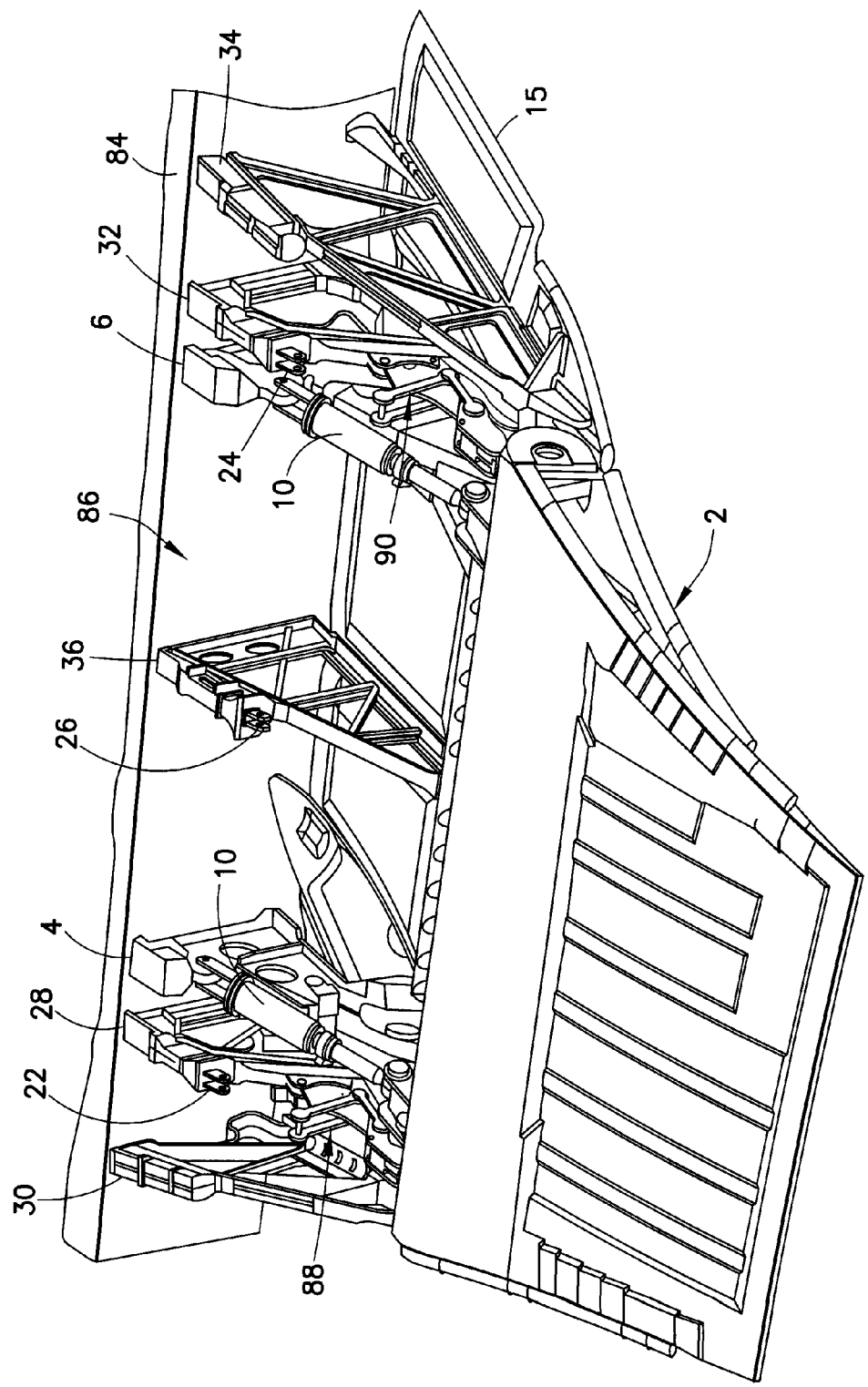
FIG. 1 is a diagram showing an isometric view of a flaperon installation with an upper rigid hinged panel removed.
Figure 2:
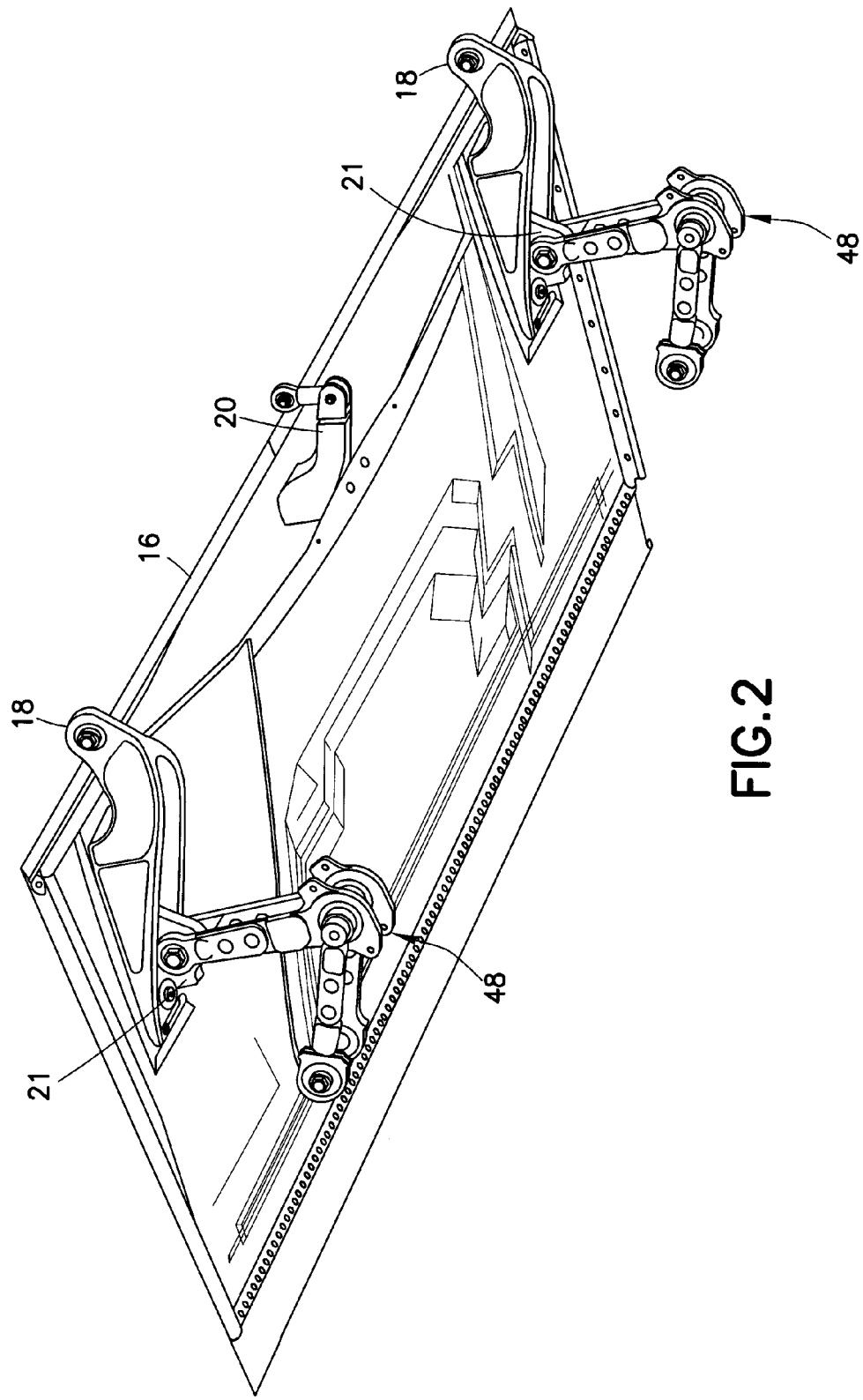
FIG. 2 is a diagram showing an isometric view of the upper rigid hinged panel which was not shown in FIG. 1.

FIGS. 1-5 show components of an assembly for actuating a trailing edge device 2 in accordance with one embodiment. For purposes of illustration, the trailing edge device 2 shown in FIG. 1 is illustrated as a generally trapezoidal-shaped flaperon. However, the general principles in accordance with which the flaperon 2 is coupled for movement relative to a wing may be applied to other types of trailing edge devices as well.

Figure 3:
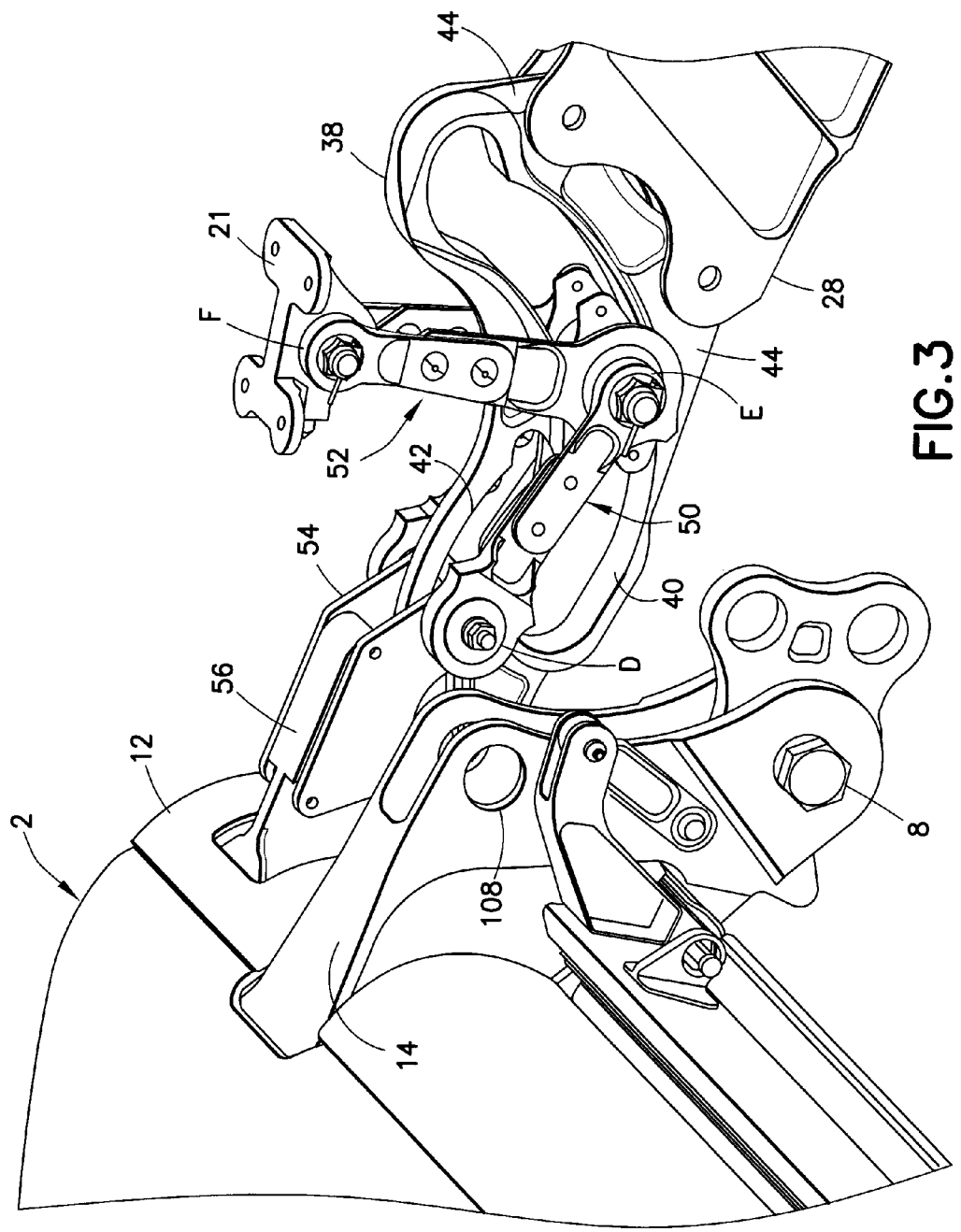
FIG. 3 is a diagram showing an isometric view of the drive link incorporated in the embodiment depicted in FIGS. 1 and 2, the drive link including joints D-E-F.
Figure 4:
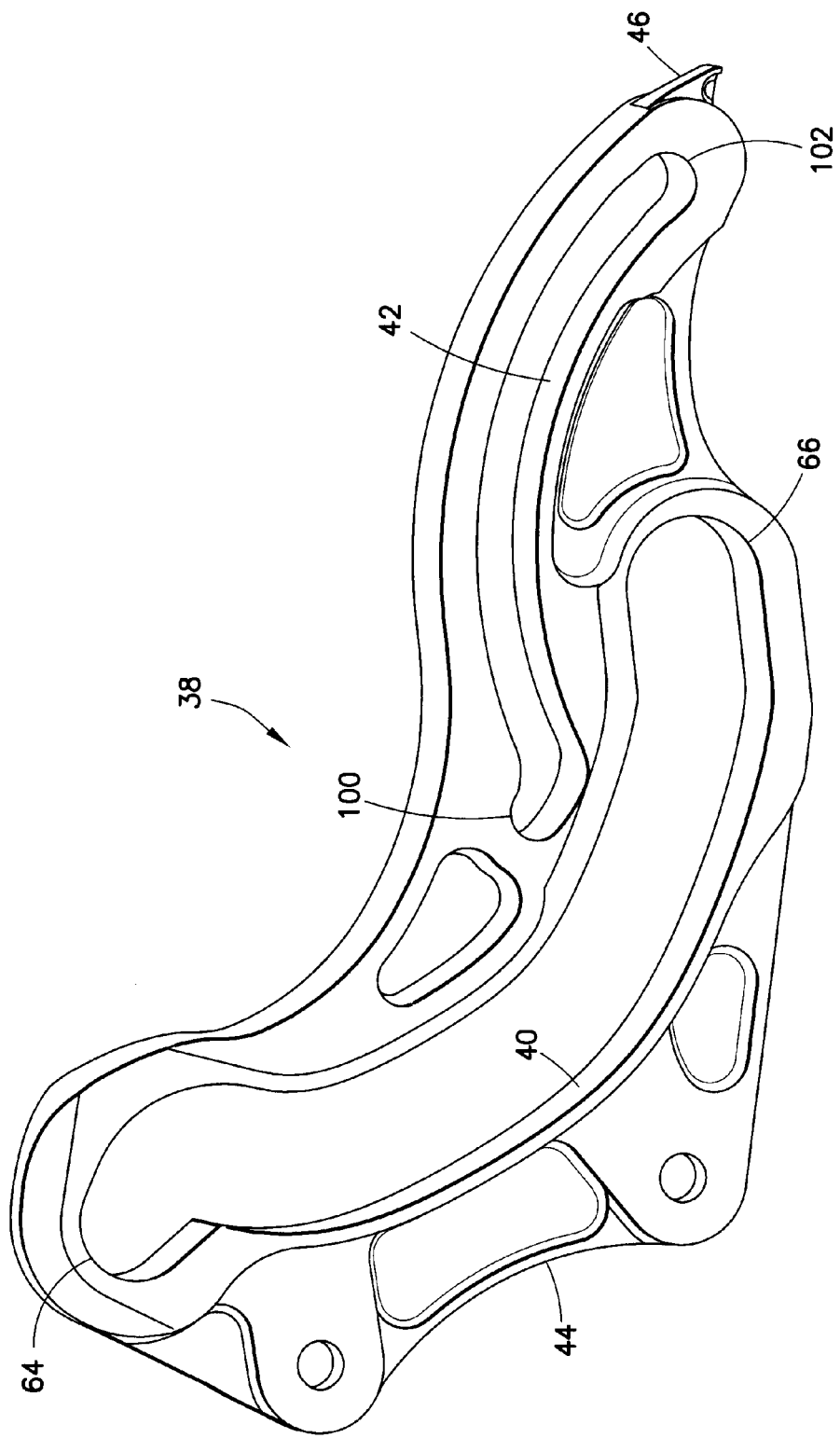
FIG. 4 is a diagram showing an isometric view of a unitary cam track assembly incorporated in the embodiment depicted in FIGS. 1 and 2.

Referring to FIGS. 1 and 3, the flaperon 2 is pivotably coupled to the aft ends of a pair of actuator hinge ribs 4 and 6, which are attached to the wing (see FIG. 1) at respective joints 8 (only one of which is shown in FIG. 3). Each joint 8 can include a pin or other pivot element. The joints 8 allow the flaperon 2 to rotate relative to the wing about a pivot axis. The pivot axis (i.e., the axis of joint 8 in FIG. 3) is positioned so that as the flaperon 2 deploys, it opens a gap between the leading edge of flaperon 2 and the wing in a well-known manner. For example, the pivot axis can be positioned below and outside the general contour of the wing. Although FIG. 1 shows only two actuator hinge ribs 4 and 6, the flaperon 2 may be pivotably coupled to the wing using more than two actuator hinge ribs.

Still referring to FIG. 1, the coupling between the flaperon 2 and the wing further comprises respective actuators 10 which extend or retract to cause flaperon 2 to pivot about its pivot axis in one direction or the opposite direction. The forward end of each actuator 10 is pivotably coupled to a respective actuator hinge rib (4 or 6), while the aft end of each actuator 10 is pivotably coupled to the flaperon 2.

FIG. 3 shows a flaperon hinge fitting 14 which is attached to the leading edge 12 of the flaperon 2. The flaperon 2 is pivotably coupled to each actuator hinge rib and each corresponding actuator by means of a respective flaperon hinge fitting 14 having the structure seen in FIG. 3. Each actuator is coupled to a respective flaperon hinge fitting 14 by a joint (not shown in FIG. 3) that will pass through openings 108 of the flaperon hinge fitting 14; and each actuator hinge rib (not shown in FIG. 3) is coupled to a respective flaperon hinge fitting 14 by a respective flaperon pivot joint 8.

FIG. 1 shows the flaperon installation with a rigid hinged panel removed. That rigid hinged panel (RHP) 16 has the structure depicted in FIG. 2. The rigid hinged panel 16 may be made of carbon fiber-reinforced plastic honeycomb material. The rigid hinged panel 16 moves in concert with the flaperon 2 (as explained in more detail below) to control the size of the gap between the flaperon leading edge and the wing. The rigid hinged panel 16 is pivotably coupled to the wing by means of a pair of gooseneck hinges 18 (situated at the distal ends of respective drive lugs 21) and a swing link 20, seen in FIG. 2.

Returning to FIG. 1, the rigid hinged panel (not shown) is pivotably coupled to the wing at three RHP hinge points 22, 24, 26. The RHP hinge point 22 is part of a panel hinge rib 28 disposed between actuator hinge rib 4 and an outboard interface rib 30. The RHP hinge point 24 is part of a panel hinge rib 32 disposed between actuator hinge rib 6 and an inboard interface rib 34. The RHP hinge point 26 is part of a panel hinge rib 36 disposed generally midway between the actuator hinge ribs 4 and 6. Pivotable coupling of the rigid hinged panel to the wing is accomplished by pivotably coupling the respective gooseneck hinges 18 (seen in FIG. 2) to RHP hinge points 22 and 24 (seen in FIG. 1); and by pivotably coupling the swing link 20 (seen in FIG. 2) to RHP hinge point 26 (seen in FIG. 1).

Figure 5:
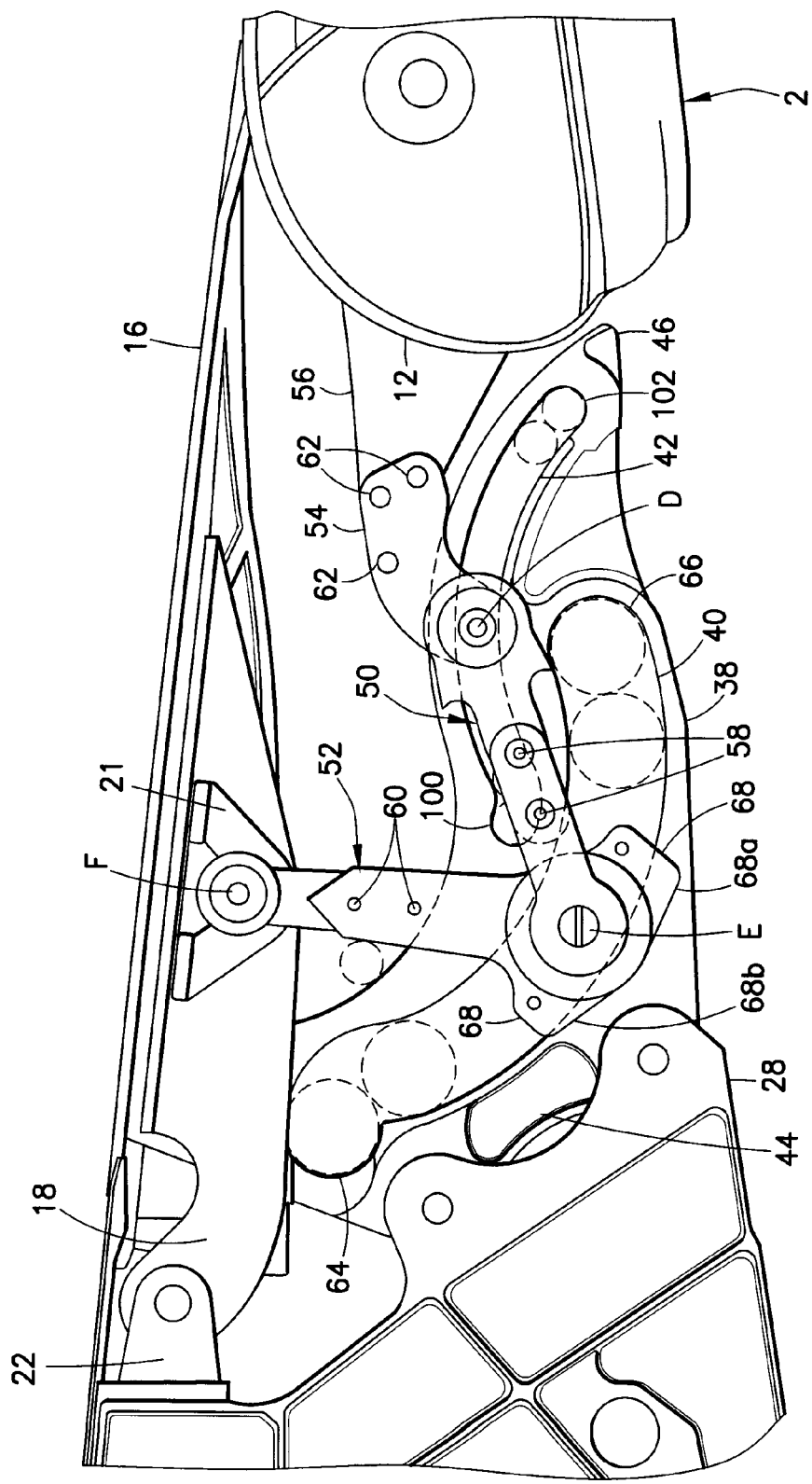
FIG. 5 is a diagram showing a side view of the drive link and cam track assembly depicted in FIG. 3, with potential obstruction locations indicated by dashed circles.

In the embodiment depicted in FIGS. 1-5, the coupling between the wing and the rigid hinged panel further comprises a pair of unitary cam track assemblies 38. An exemplary cam track assembly 38 is depicted in isolation in FIG. 4. Cam track assembly 38 comprises a forward cam surface or track 40, an aft cam surface or track 42, a cam track rib attach point 44 and a cam shroud 46. Each cam track assembly 38 is attached to a respective panel hinge rib 28 by means of its cam track rib attach point 44, as seen in FIGS. 3 and 5.

The cam surfaces provide a "programming" function to control the motion of one system component (e.g., the rigid hinged panel) relative to another (e.g., the flaperon), and/or a "catcher" function to prevent separation of those components from the wing. As explained in detail below with reference to FIGS. 3 and 5, the cam surfaces 40 and 42 are carried by the wing and control the motion of the rigid hinged panel 16. If a decrease in support of the flaperon 2 occurs, the cam surfaces act as "catchers" to prevent the flaperon 2 from separating from the wing.

In accordance with the embodiment depicted in FIG. 1, the flaperon 2 is driven to move by two actuators 10. The rigid hinged panel 16 is driven by the motion of the flaperon 2 through outboard and inboard rigid hinged panel mechanisms 88 and 90. Each rigid hinged panel mechanism comprises a respective drive linkage 48 programmed from respective forward cam surfaces 40 (see FIGS. 2 and 3). The aft cam surfaces 42 are fail-safe features which provide redundancy for the flaperon 2 and do not carry any flight- or system-generated loads. The rigid hinged panel 16 is moved downwardly to control the size of the gap between the flaperon leading edge and the wing. This arrangement can be used to control the lift and drag resulting from flaperon deployment.

As best seen in FIG. 3, each drive linkage 48 comprises three joints D-E-F, a pair of DE links 50 and a pair of EF links 52. Joint D pivotably couples the DE links 50 with respective flaperon catcher plates 54 of a flaperon catcher fitting. The catcher plates 54 are fastened to a flaperon catcher rib 56 (also part of the "flaperon catcher fitting"), which projects from the leading edge 12 of the flaperon 2. As best seen in FIG. 5, joint F pivotably couples the EF links 52 and a gooseneck hinge 18, which the rigid hinged panel 16 is attached to. As will be explained in more detail later with reference to FIG. 14, the central lengthwise section of joint D does not contact the aft cam surface during normal operation of the rigid hinged panel mechanism. In contrast, the central lengthwise section of joint E is surrounded by a roller bearing (not seen in FIG. 5, but described later with reference to FIG. 13) that rolls on the forward cam surface 40 to facilitate movement of joint E in concert with movement of flaperon 2. The roller bearings surrounding the central portion of joint E acts as a cam follower which follows the arcuate path of the forward cam surface 40.

Referring to FIG. 5, each gooseneck hinge 18, to which the rigid hinged panel is attached, is pivotably coupled to a respective pair of EF links 52 by joint F. The EF links 52 moves in concert with the movement of joint E, which moves in concert with joint D, which moves in concert with the flaperon 2. Accordingly, as the flaperon rotates, the drive linkages 48 cause the rigid hinged panel 16 to rotate.

As shown in FIG. 3, the joints D and E remain in the respective cam surfaces 40 and 42 during flaperon deployment, so as to be captured in the event that other elements of the coupling (e.g., an actuator hinge rib 4/6, a flaperon hinge fitting 14, or a flaperon pivot joint 8) provide a reduced level of support.

Due to linkage mechanism movement and the trapped cam surfaces in the type of flaperon assembly depicted in FIGS. 1-5, there are many possibilities for obstructions to occur. The obstruction can occur within the mechanism movement, in the cam track or surface, or in a pinching jam between moving and stationary parts. As disclosed hereinafter, technical features can be added to make it unlikely for a jam obstruction to occur within the range of motion of the mechanism and, further, to ensure that if a jam/obstruction occurs, the rigid hinged panel and associated mechanisms will not depart the airplane.

1.0 Jam Alleviation

As disclosed below, while jam protection features have been provided on both the forward and aft cam surfaces associated with the rigid hinged panel drive linkage, the design of the linkage and cam surfaces are such that obstructions at various positions require load alleviation within the linkage. The alleviation is accomplished in a manner such that all major structural components will be retained on the airplane subsequent to the mechanism encountering an obstruction at any one of the multiplicity of positions indicated by dashed circles in FIG. 5. In the event of a jam-induced overload, the method of alleviation is a structural fuse (e.g. by shearing of material) of the mechanism. For example, various fusing fasteners can be designed to shear when the jamming load reaches a certain threshold. In the embodiment disclosed herein, fusing fasteners 58, 60 and 62 are designed to shear when certain load levels are reached due to jamming, causing the associated fastened elements to disengage. Subsequent to jam alleviation, the rigid hinged panel 16 will continue to operate by the mechanism on the side of the flaperon rigid hinged panel that remains intact after fusing and will be capable of reacting limit airloads. This condition will have a minor effect on the operation of the flaperon 2 and rigid hinged panel 16. After structural fusing for load alleviation, portions of linkage in non-typical locations will be observed.

The potential for secondary jams has been considered for the post-fusing condition with no conditions found that would result in further jam conditions sufficient to pose a threat to continued safe flight and landing. Flight controls systems are located forward of the rigid hinged panel mechanism, which ensures that there are no detrimental secondary effects to the flight controls systems resulting from structural fusing of the rigid hinged panel mechanism. The actuator relief valve (a system component) prevents the actuators from generating infinite load; the relief valve releases the energy buildup within the systems load loop to protect the systems downstream. The structural fuse capability reacted through the mechanism is set higher than the flaperon actuator capability at the relief valve setting. Under some conditions where the mechanism could fuse, the flaperon actuator relief valve may be tripped but would not result in an actuator jam condition.

An analysis was made to review the potential for structural overload of the rigid hinged panel mechanism during a hardover condition on the flaperon actuator or the skew resulting from a failed actuator (resulting in a windup of the flaperon surface up to the point where the failed actuator relieves at the relief valve setting in the actuator). In both of these cases, the load input into the mechanism is below the threshold of structural fusing required for jam alleviation. Thus the mechanism remains intact for these two actuator failure conditions.

2.1 Aft Cam Surface Obstruction

Referring again to FIG. 5, there are potential jam locations within the aft cam surface 42 at the aft and forward ends where an obstruction internal to the aft cam surface 42 could impede the motion of the DE links 50 where they attach to the flaperon catcher plates 54 of the catcher fitting. The positions of these aft obstructions are indicated by small dashed circles within the aft cam surface 42 in FIG. 5.

When the flaperon 2 and rigid hinged panel 16 are commanded down and an obstruction is encountered at the aft end of the aft cam surface 42, structural fusing within the catcher fitting (e.g., shearing of fusing fasteners 62 which fasten the flaperon catcher plates 54 to the flaperon catcher rib 56) will relieve the overload, preventing the flaperon catcher rib 56 from being pulled out of the flaperon 2. With this overload relieved, motion of the flaperon 2 and rigid hinged panel 16 can continue unimpeded with the rigid hinged panel 16 being driven from the mechanism on the opposite end of the flaperon 2 (resulting in a small amount of rigid hinged panel torsional wind-up). The remaining intact structure will be capable of reacting limit airloads. Subsequent to shearing of fusing fasteners 62, the flaperon catcher plates 54 of the catcher fitting are separated from the flaperon catcher rib 56 and are free to move and rotate about joint D. This will not result in any secondary jam conditions sufficient to pose a threat to continued safe flight and landing.

Similarly, when the flaperon 2 and rigid hinged panel 16 are commanded up and an obstruction is encountered at the forward end of the aft cam surface 42, structural fusing within the catcher fitting (comprising flaperon catcher plates 54 fastened to flaperon catcher rib 56) will relieve the overload, preventing the flaperon catcher rib 56 from being pushed into the flaperon 2. With this overload relieved, motion of the flaperon 2 and rigid hinged panel 16 can continue unimpeded with the rigid hinged panel 16 being driven from the mechanism on the opposite end of the flaperon 2 (again, resulting in a small amount of rigid hinged panel torsional wind-up). The remaining intact structure will be capable of reacting limit airloads. Subsequent to shearing of fusing fasteners 62, the flaperon catcher plates 54 of the catcher fitting are again separated from the flaperon catcher rib 56 and are free to move and rotate about joint D. This will not result in any secondary jam conditions sufficient to pose a threat to continued safe flight and landing.

In either of these cases, fusing within the DE links 50 (e.g., shearing of fusing fasteners 58 which fasten the DE link segments) can also occur if the obstruction is of adequate size. If the obstruction is large enough, the DE links 50 will experience sufficient axial loading to fuse through the continued motion of the rigid hinged panel 16 and the intact mechanism on the opposite end of the flaperon 2. In either case (upward or downward motion), subsequent motion of the remainder of the intact mechanism can continue unimpeded with intact EF links 52. Whether the obstruction is encountered at the forward or aft end of the aft cam surface 42, the resulting alleviation will result in a condition where the rigid hinged panel 16 or any significant portion of the structure will not depart the airplane.

2.2 Internal Scissors Jam

A scissors jam is defined as an obstruction internal to either the aft or forward cam surface where the side of the upper or lower rigid hinged panel drive links contacts an obstruction trapped within a cam surface.

Still referring to FIG. 5, an obstruction may be encountered by one side of a pair of DE links 50 (of either outboard or inboard RHP mechanisms 88 and 90 shown in FIG. 1) as they go through their range of motion as the flaperon 2 and rigid hinged panel 16 is driven up or down. Potential scissors jam-producing obstruction locations in the aft cam surface 42 are indicated by dashed circles in FIG. 6; potential scissors jam-producing obstruction locations in the forward cam surface 40 are indicated by dashed circles in FIG. 7. The sides of the pair of DE links 50 pass across the opening in the aft cam surface (see FIG. 6) and the forward cam surface (see FIG. 7) where the continued motion would result in an applied bending moment into the DE links 50. Structural fusing within the DE links 50 (e.g., shearing of fusing fasteners 58) will allow the link to relieve this condition and allow unimpeded motion of the remainder of the intact mechanism. The remainder of the mechanism is capable of reacting the limit airloads on the rigid hinged panel 16 driven through the intact linkage, resulting in a condition where the rigid hinged panel 16 or any significant portion of the structure will not depart the airplane. Subsequent to structural fusing, the separated segments of fused DE links 50 are free to rotate about joints D and E, respectively, and will not result in any secondary jam conditions sufficient to pose a threat to continued safe flight and landing. In particular, as will be described later with reference to FIGS. 8 and 9, the ends of the separated segments of the fused DE links have either rounded or angled ends to prevent a secondary jam.

Figure 7:
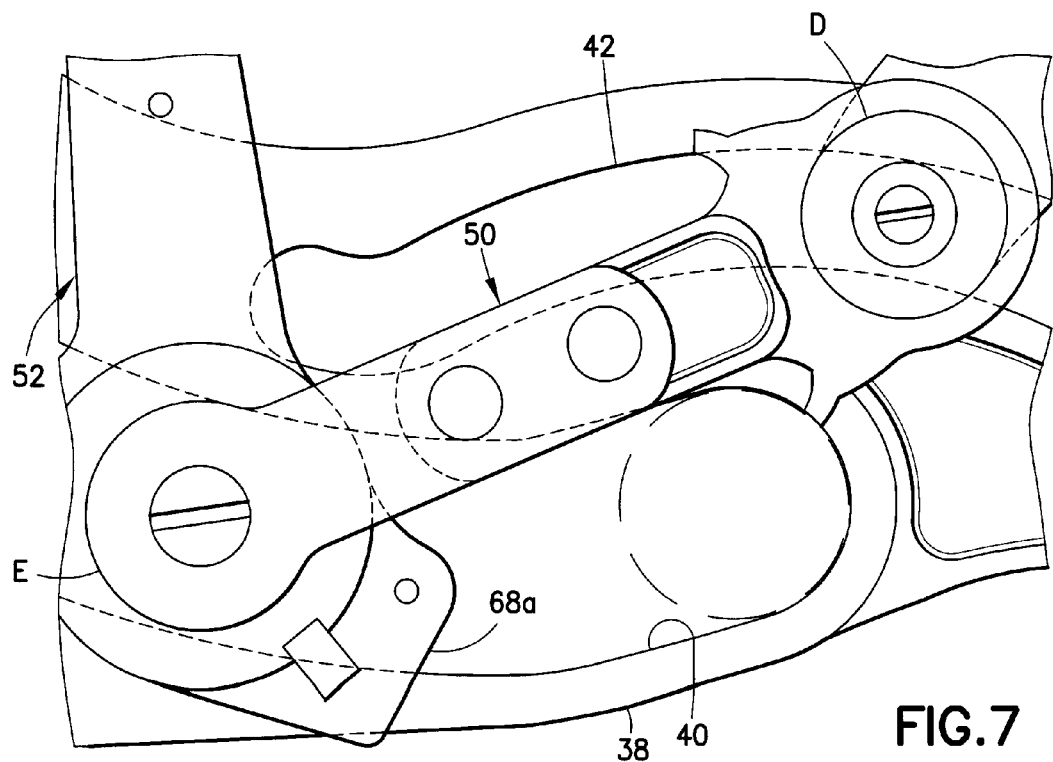
FIG. 7 is a diagram showing a side view of the drive link and cam track assembly, with potential scissors jam-producing obstruction locations in a forward cam surface indicated by dashed circles.

In the event that the obstruction is sufficiently large that the continued downward motion of the intact mechanism (past what is shown in FIG. 7) encounters the obstruction at the full range of motion at the aft end of the forward cam surface, further alleviation may be required. This condition and the related effects are covered in Section 2.5.

2.3 Upper External Obstruction

Referring again to FIG. 5, the small dashed circle located external to the upper portion of the cam track assembly and in contact with the left sides of a pair of EF links 52 represents another potential obstruction location. Such an obstruction encountered by the sides of EF links 52 would result from an item being trapped between the upper portion of the cam track assembly and the EF links 52 when the flaperon 2 and rigid hinged panel 16 are commanded up. Structural fusing within the EF links 52 will relieve this condition and allow unimpeded motion of the remainder of the intact mechanism. The remainder of the mechanism is capable of reacting the limit airloads on the rigid hinged panel 16 driven through the intact linkage and as a result of the obstruction, the rigid hinged panel 16 is designed to not depart the airplane. Subsequent to structural fusing, the separated segments of the fused DE links 50 are free to rotate about joints D and E, respectively, and will not result in any secondary jam conditions sufficient to pose a threat to continued safe flight and landing.

2.4 Upper Forward Obstruction in Forward Cam

FIG. 5 also shows an obstruction (indicated by two dashed circles) internal to the forward cam surface 40 near its forward end. The EF links 52 (shown not in contact in FIG. 5) would come into contact with such an obstruction during forward motion of the linkage associated with the flaperon and rigid hinged panel motion driving into a Trailing Edge Up position. The size of the obstruction for this condition is equivalent to two times the diameter of the roller bearing for joint E.

A runout region 64 at the upper end of the forward cam surface 40 provides space for any internal obstruction that has a diameter slightly smaller than the diameter of the roller bearing (not visible in FIG. 5) at joint E. This forward cam runout region 64 will allow for an obstruction to be pushed to the upper end of the forward cam surface 40 and allow unimpeded motion of the mechanism. The runout area at the top of the forward cam surface 40 is configured such that the roller bearing cannot roll directly into these areas. This is done so that the airload applied to the rigid hinged panel 16 does not try to pull the bearing into a position that could cause a binding motion of the links to occur.

Figure 8:
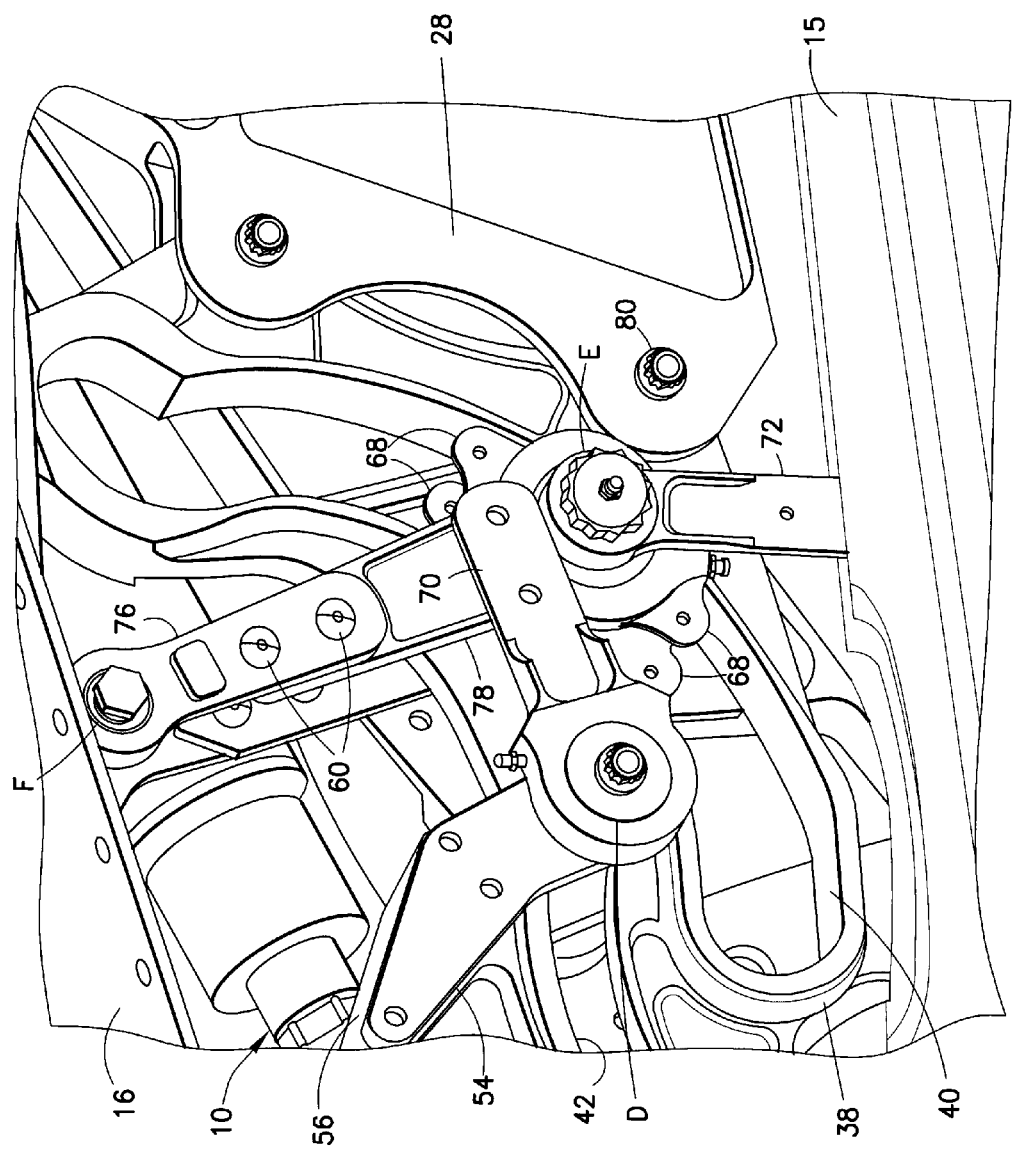
FIGS. 8 and 9 are diagrams showing isometric views of the drive link and cam track assembly for two scenarios which might arise from structural fusing of the DE link fasteners in response to a jam.
Figure 9:
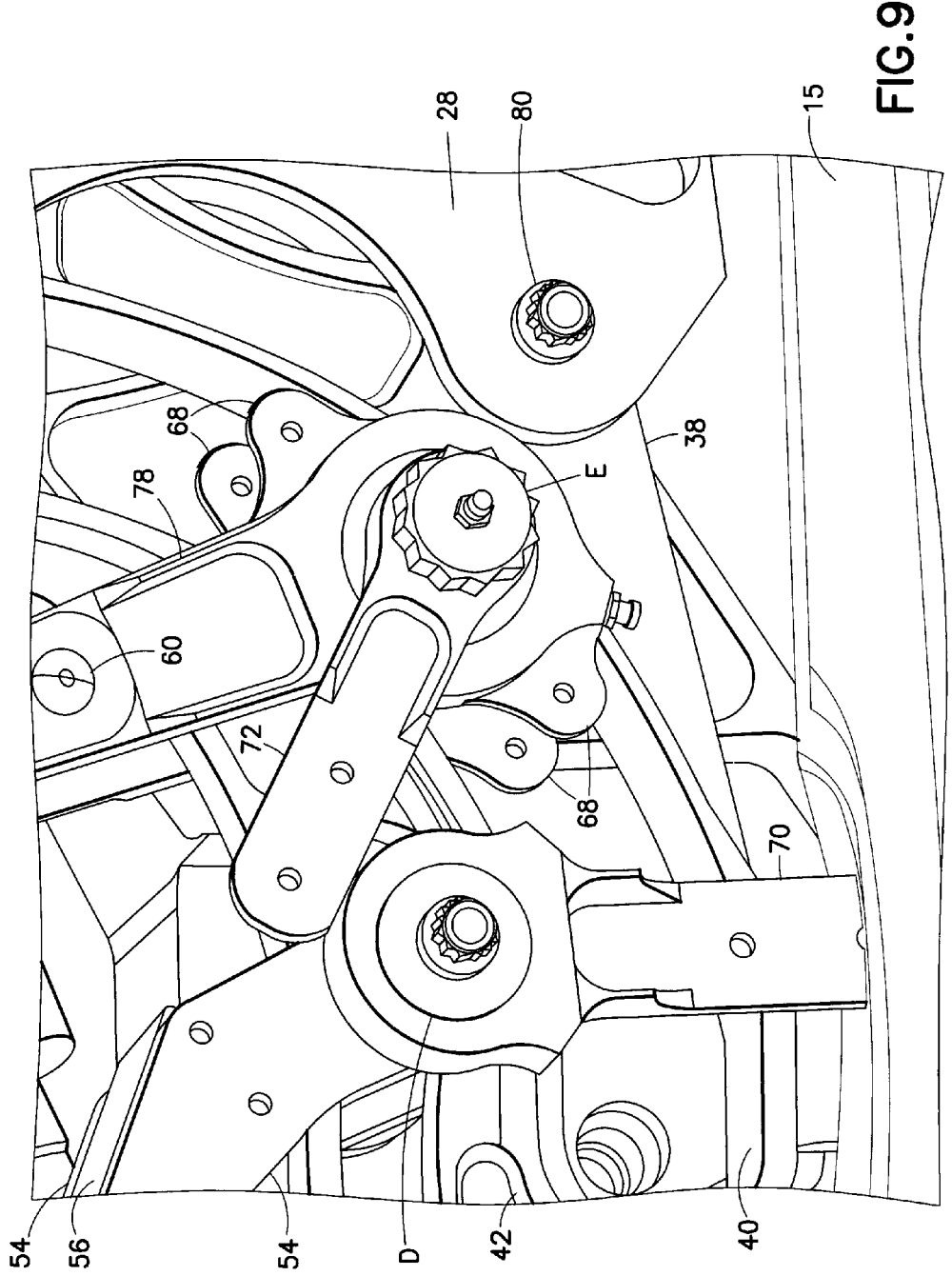

In addition, structural fusing of the DE links 50 is provided for alleviating the link load when the joint E bearing contacts an obstruction greater than twice the size of the diameter of the bearing. As the flaperon 2 and rigid hinged panel 16 are commanded up and the roller bearing for joint E contacts the obstruction at the top of the forward cam surface 40, fusing (e.g., shearing of fusing fasteners 58) will relieve the axial compression loads in the DE links 50 and the rigid hinged panel 16 is capable of the torsional windup associated with this condition. The remainder of the mechanism is capable of reacting the limit airloads on the rigid hinged panel 16 driven through the remaining intact linkage (opposite end of the rigid hinged panel 16 from the obstruction). Subsequent to structural fusing, the separated segments of fused DE links 50 are free to rotate about joints D and E, respectively, as seen in FIGS. 8 and 9, and will not result in any secondary jam conditions. Additionally the mechanism is free to travel along the remainder of the cam surface driven by the intact connection to the rigid hinged panel 16 through the intact mechanism on the opposite end of the rigid hinged panel 16.

2.5 Lower Aft Obstruction in Forward Cam

FIG. 5 also shows an obstruction (indicated by two dashed circles) internal to the forward cam surface 40 near its aft end. The EF links 52 (shown not in contact in FIG. 5) would come into contact with such an obstruction during aft motion of the linkage associated with the flaperon and rigid hinged panel motion driving into a Trailing Edge Down position. The size of the obstruction for this condition is greater than two times the diameter of the roller bearing for joint E.

A runout region 66 at the lower end of the forward cam surface 40 provides space for any internal obstruction that has a diameter equivalent to the diameter of the roller bearing at joint E. This forward cam runout region 66 will allow for an obstruction to be pushed to the lower end of the forward cam surface and allow unimpeded motion of the mechanism.

In addition, structural fusing of the EDs link 50 is provided for alleviating the link load when contacting an obstruction greater than twice the size of the diameter of the bearing for joint E. As the flaperon 2 and rigid hinged panel 16 are commanded down and the roller bearing for joint E contacts the obstruction at the lower end of the forward cam surface 40, fusing (e.g., shearing of fusing fasteners 58) will relieve the axial tension loads in the DE links 50 and the rigid hinged panel 16 is capable of the torsional windup associated with this condition. This torsional windup may produce compression loads in the EF links 52 that would be sufficient to fuse these links as well. The remainder of the mechanism is capable of reacting the limit airloads on the rigid hinged panel 16 driven through the remaining intact linkage. Subsequent to structural fusing, the separated segments of the fused DE links 50 are free to rotate about joints D and E, respectively, as seen in FIGS. 8 and 9, and will not result in any secondary jam conditions. The mechanism is free to travel along the remainder of the cam surface driven by the intact connection to the rigid hinged panel 16 and the mechanism on the opposite end of the rigid hinged panel 16.

2.6 Potential Jam Associated with Link Tabs

Figure 6:
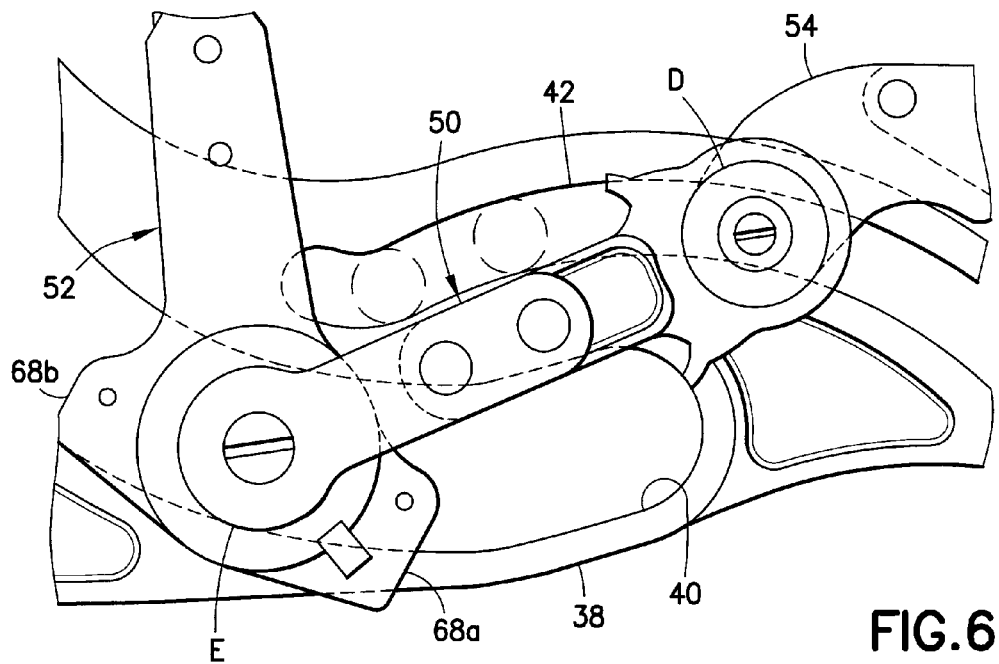
FIG. 6 is a diagram showing a side view of the drive link and cam track assembly, with potential scissors jam-producing obstruction locations in an aft cam surface indicated by dashed circles.

As seen in FIG. 5, each EF link 52 has two tabs 68 near joint E that are used to attach a respective rub plate (see rub plates 82 in FIG. 13) that assists with guiding and centering the links and bearing in the forward cam surface 40. In accordance with one embodiment, each rub plate attachment tab 68 can be extended to include shroud features 68a and 68b, as seen in FIG. 5 (these shroud features are also shown in FIGS. 6 and 7, but are not shown in FIGS. 8-11). These shroud features will prevent an object from becoming trapped between a rub plate attachment tab and the cam forward surface 40 during the slight rotation that the EF links 52 goes through about joint E.

2.7 Secondary Jam Potential

Subsequent to structural fusing, portions of the fused components will remain attached to the intact structure and some portions will continue to move with the linkage as the rigid hinged panel 16 moves with the flaperon 2. It has been determined by analysis that these components will not result in any secondary jam potential and will not cause any significant local collateral damage during the subsequent motion. The fused elements may cause local discrete damage to the lower fixed trailing edge panel 15 and panel support clip but will not result in risk to continued safe flight and landing.

FIGS. 8 and 9 show two situations which might arise from structural fusing of the DE link fasteners in response to a jam. The distal ends of link segments 70 and 72 of each DE link 50 have rounded corners to prevent subsequent jams. FIG. 8 shows a possible situation where a link segment 72 of a DE link penetrates and damages the lower fixed trailing edge panel 15. FIG. 9 shows a possible situation where a link segment 70 of a DE link penetrates and damages the lower fixed trailing edge panel 15, which is made of composite material. This damage can be detected during visual inspection of the wing.

Figure 10:
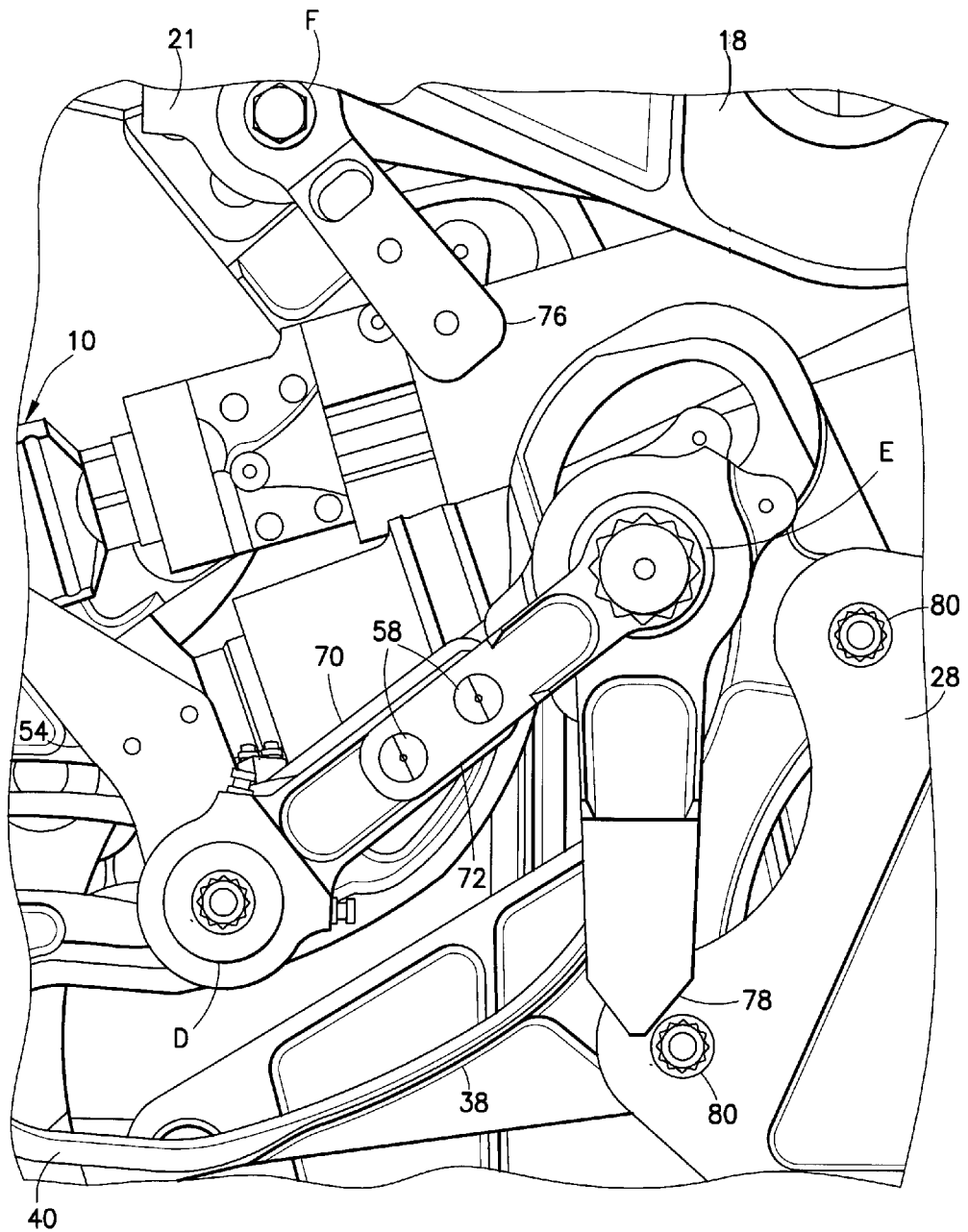
FIGS. 10 and 11 are diagrams showing isometric views of the drive link and cam track assembly for two scenarios which might arise from structural fusing of the EF link fasteners in response to a jam when the flaperon is deployed upward.
Figure 11:
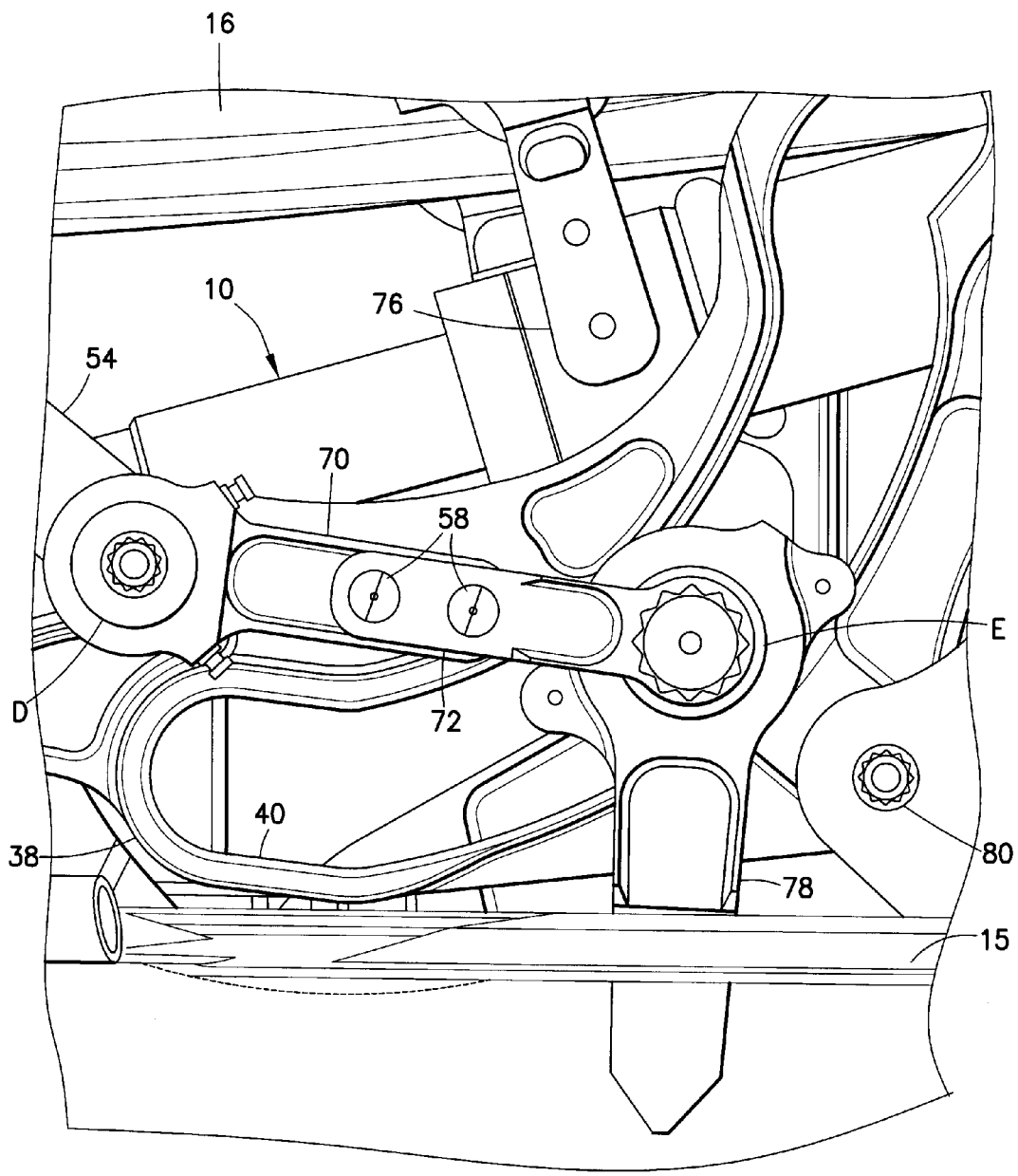

FIGS. 10 and 11 show two situations which might arise from structural fusing of the EF link fasteners in response to a jam when the flaperon is deployed upward. The distal ends of link segment 76 of each EF link 52 have rounded corners, while the distal ends of link segment 78 of each EF link 52 are designed with a V shape to avoid contact with the cam track bolts 80 (only one of which is visible in FIG. 10). FIG. 11 shows a possible situation where a link segment 78 of an EF link penetrates and damages the lower fixed trailing edge panel 15. This damage can be detected during visual inspection of the wing.

In an analogous manner, the plates of the catcher fitting can be designed to prevent any subsequent jams on major structural components after fusing of a catcher fitting (e.g., shearing of fusing fasteners 62 seen in FIG. 5). Although not shown in the drawings, it is possible that the catcher fitting will penetrate and damage the lower fixed trailing edge panel, which damage would again be detectable during visual inspection of the wing.

2.8 Structural Fuse Engineering Requirements

In accordance with the embodiment disclosed herein, the structural fusing on the ED and EF links as well as the catcher fitting relies on production fasteners with additional strength margins on the supporting structure to protect for fastener shear strengths higher than the quoted minimum capabilities. Production fasteners have a higher capability scatter factor than designed fuse pins. To account for this, a fuse range of X % above fastener shear allowable will capture minimum to maximum fusing. Supporting structure will carry an additional Y % margin safety factor to ensure that structural fusing occurs at the intended fusing fastener [i.e., backup margin= (fastener shear allowable)×(1+X/100)×(1+Y/100)].

3.0 Jam Protection Features

The design philosophy of the rigid hinged panel mechanism and cam surfaces is to prevent a jam from occurring so that the previously described alleviation is not required. Close attention has been paid to design details that would avoid conditions where an object could become trapped within the mechanism or cause the mechanism to seize. These jam protection features, described in the following sections, include the following: (3.1) the cam track assemblies have an open architecture; (3.2) each cam surface has a narrow profile; (3.3) the cam surfaces are located in an enclosed cove; (3.4) each panel hinge rib, which supports a respective cam track assembly, is isolated between other ribs; (3.5) the roller bearings have crowned rollers which are narrower than the width of the cam surfaces; (3.6) extra run-out space is provided at both ends of each cam surface; (3.7) the shape and clearance on the cam surfaces are designed to prevent items from lodging; (3.8) the cam surfaces are made of corrosion-resistant steel (CRES) with lubricated ORES cam roller bearings; (3.9) a shroud feature prevents a trapped jam; and (3.10) two features are provided for fastener retention.

These design features significantly reduce the potential for any obstruction to exist anywhere within the cam track assembly. However if an obstruction is present, it will be pushed toward the ends of the cam surface and if large enough, the structural fuse alleviation as previously described will result.

3.1 Cam Surface Open Architecture

The cam surfaces have an open architecture, meaning that features on the cam surfaces do not have areas that can contain items attributable to a jam. This design prevents debris from either getting caught or attached to the cam surfaces.

3.2 Cam Surface Narrow Profile

The narrow width of the cam surfaces (see FIG. 12) does not allow any debris of significant width or size to remain on the cam surface. The requirement for the cam surface width is much narrower than conventional cam designs. This is because the applied loads required to operate the rigid hinged panel have a low magnitude, resulting in a narrow design. As such, it is difficult for foreign objects to lodge on the cam surface. Preferably the cam height is at least 1.5 times the width of the cam surface. This provides very limited capability for anything reasonably associated with aircraft operations to remain on the cam surface.

3.3 Cam Surfaces in an Enclosed Cove

As seen in FIG. 1, the cam surfaces for the rigid hinged panel (not shown) are located forward of the flaperon 2 and aft of the wing rear spar 84 in a trailing edge cove 86, which is bounded on the top and bottom by the rigid hinged panel and the fixed lower trailing edge panel 15 respectively. The cove encloses the areas where the cam surfaces are located. The fixed lower trailing edge panels 15 protect the area from debris thrown up by the tires of the wing-mounted main landing gear units, resulting from engine thrust effects or debris falling from above the wing. Such an enclosure limits any small debris getting into the area to cause a jam.

In addition to this being a closed cove area, all of the critical airplane systems are located forward of the mechanism. This ensures that none of the systems can come loose and impede the motion of the rigid hinged panel mechanism or for any attachment hardware (such as an electrical clamp) to come loose and become lodged in the mechanism.

3.4 Cam Track Assembly Isolated Between Ribs

Figure 12:
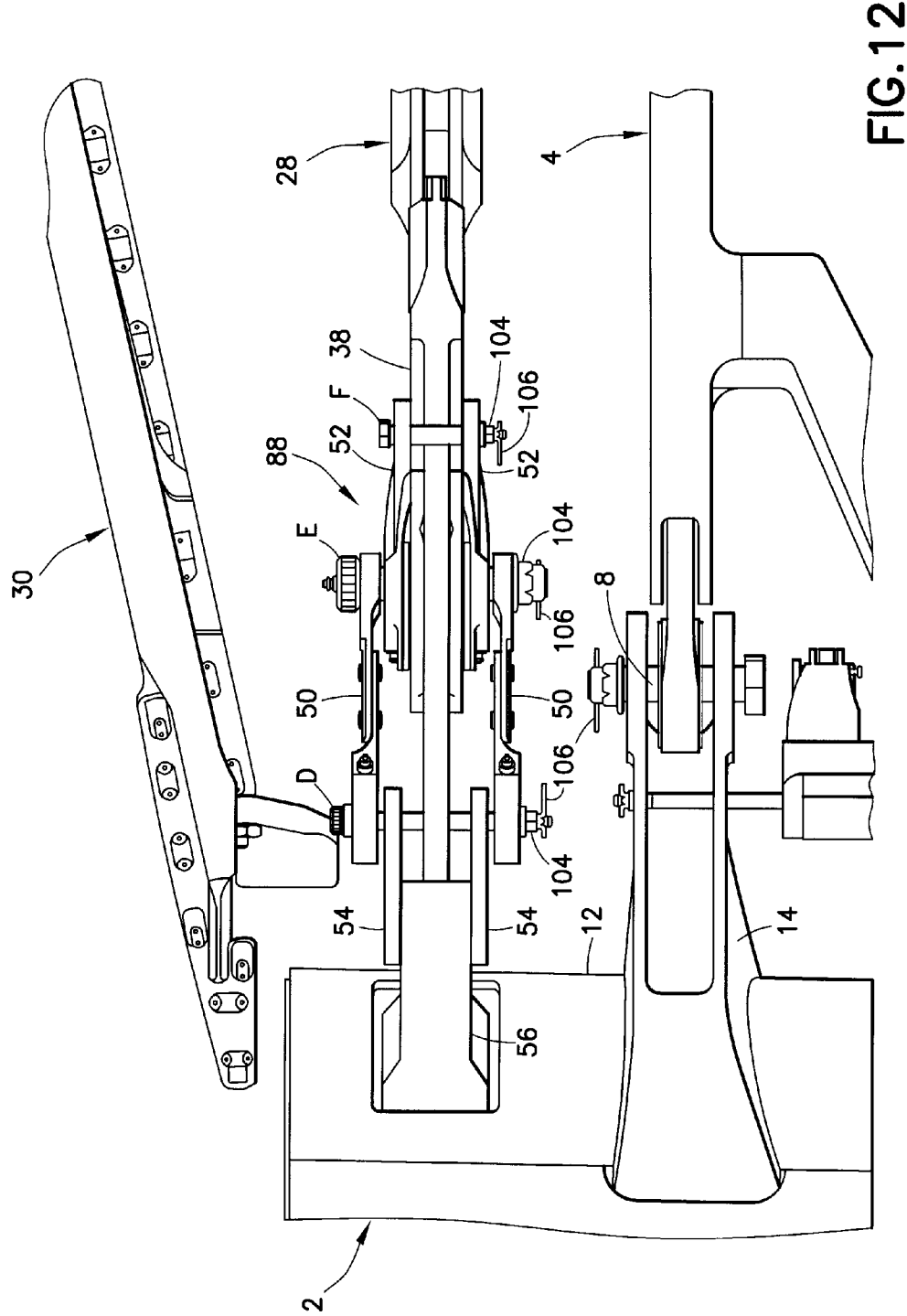
FIG. 12 is a diagram showing a top view of a portion of the flaperon installation depicted in FIG. 1.

Further protection of the cam surfaces is provided by the ribs on either side of the rigid hinged panel mechanism. As seen in FIG. 12, the outboard RHP mechanism 88 is located between actuator hinge rib 4 and outboard interface rib 30. Similarly, the inboard RHP mechanism 90 (see FIG. 1) is located between actuator hinge rib 6 and inboard interface rib 34. The cove lower panels and the ribs block access, preventing debris from entering this area.

3.5 Crowned Rollers Narrower than Cam Surface Width

Figure 13:
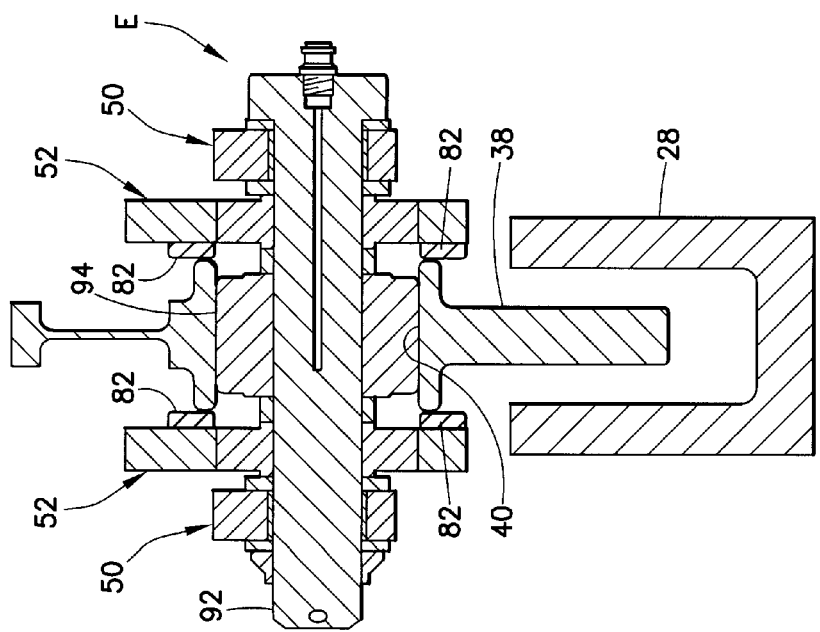

FIG. 13 shows a sectional view at joint E of the rigid hinged panel mechanism. Joint E comprises a pivot pin 92 having a central section which is surrounded by a roller bearing 94, which facilitates travel along the forward cam surface 40. As seen in FIG. 13, the pair of EF links 52 are attached to the pivot pin 92, while the DE links 50 are pivotably mounted to the pivot pin 92 by respective bearings. The roller bearing used at joint E is a 2.0-inch-diameter stainless steel needle bearing typically used in similar applications with excellent service performance and low incidence of corrosion-related issues. This bearing comprises a multiplicity of crown rollers. With a crown roller on the flat aft cam surface, the contact area is concentrated at the bearing crown. With the width of the forward cam surface at W inches, a bearing width of 0.714 W inch and a contact width of the crowned bearing to cam surface of less that 0.179 W inch, there is reduced opportunity for debris to jam the rollers in the cam surface.

Figure 14:
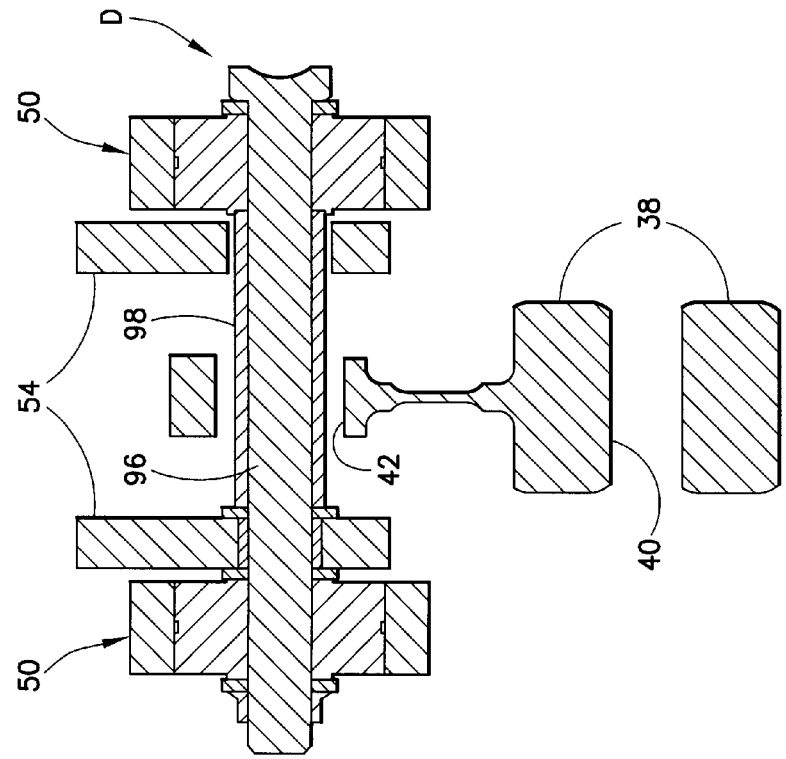
FIGS. 13 and 14 are diagrams showing sectional views along respective planes that respectively intersect the axes of joints E and D of the drive link depicted in FIG. 3.

FIG. 14 shows a sectional view at joint D of the rigid hinged panel mechanism. Joint D comprises a fail-safe pin 96 having a central section which is surrounded by a bushing 98. As seen in FIG. 14, the pair of DE links 50 are attached to the fail-safe pin 96, while the flaperon catcher plates 54 of the catcher fitting are pivotably mounted to the pivot pin 92 and a straight bushing 98 respectively. The aft cam surface 42 is a fail-safe feature, so joint D is much smaller and is designed to not contact the aft cam surface 42. Therefore, it is not subjected to small debris affecting its motion. The bushing 98 is made of CRES material with a low incidence of corrosion-related issues.

3.6 Extra Run-Out Space at Ends of Cam Surfaces

In accordance with another feature, additional clearance is provided at each end of the cam surfaces up to one diameter (i.e., the height of each cam surface) in size for the following reasons: (a) to prevent accumulation of debris at either end of the cam surface, which might interfere with the operation of the rigid hinged panel mechanism; and (b) to allow debris to be pushed to the end of the cam surfaces without interfering with the operation of the rigid hinged panel mechanism.

Figure 15:
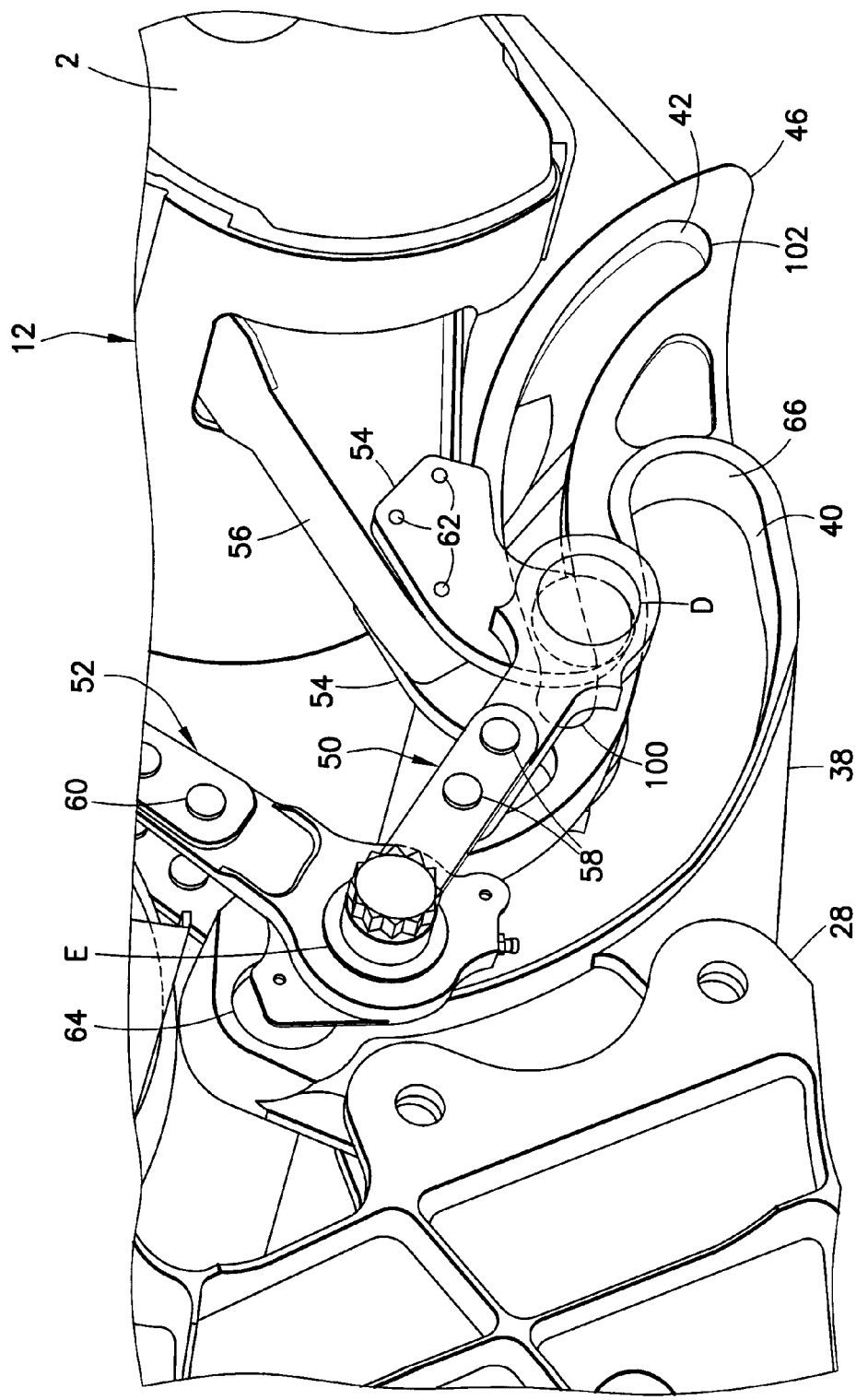
FIG. 15 is a diagram showing an isometric view of the cam track assembly and positions of associated components with the flaperon deployed upward.

FIG. 15 shows the cam track assembly 38 and positions of associated components with the flaperon deployed upward. The runout area 64 at the top of the forward cam surface 40 is configured such that the roller bearing (item 94 in FIG. 13) cannot roll directly into this area. This is done so that the airload applied to the rigid hinged panel does not try to pull the bearing into a position that could cause a binding motion of the links to occur. The forward end of aft cam surface 40 also has a runout region 100.

Figure 16:
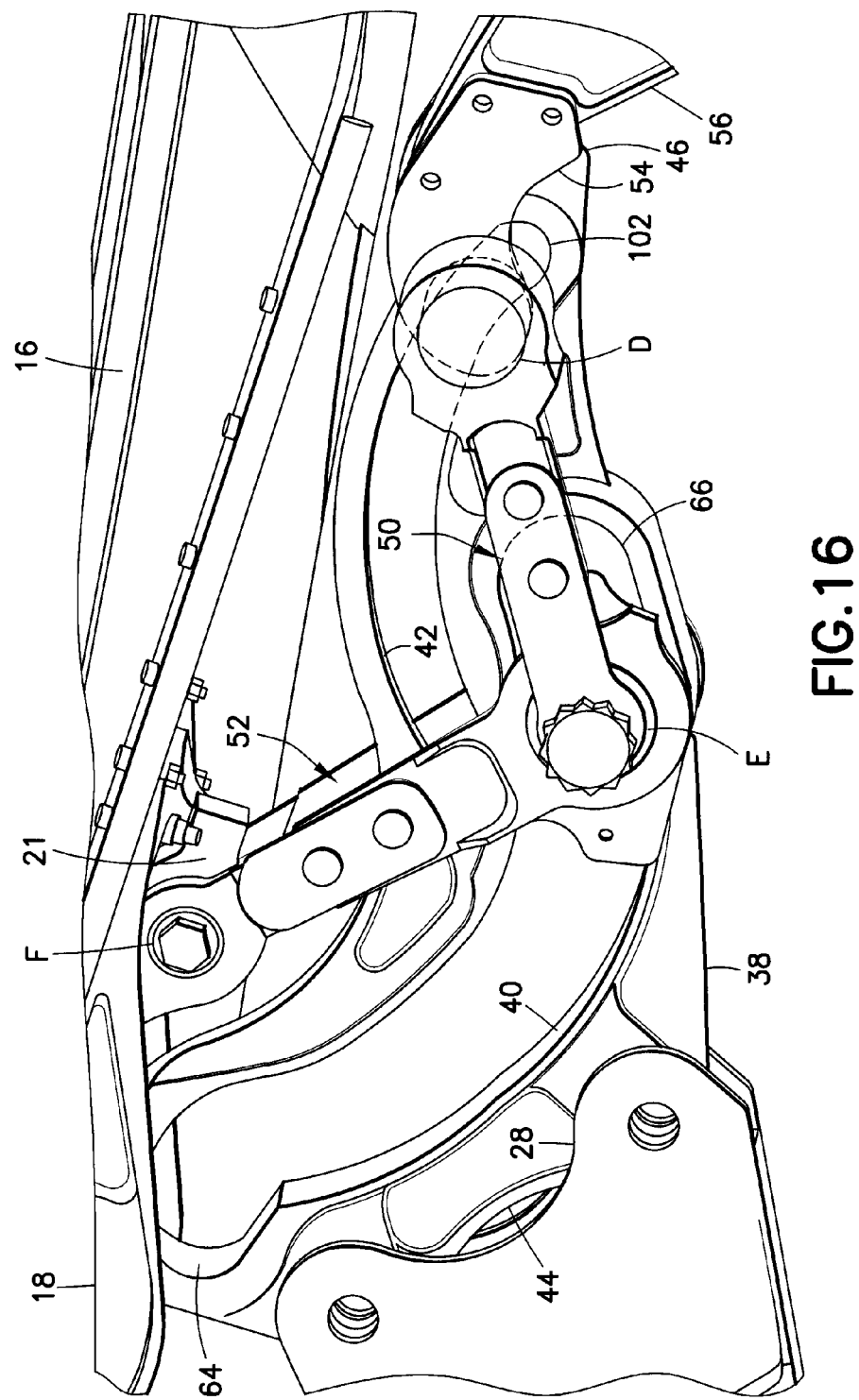
FIG. 16 is a diagram showing an isometric view of the cam track assembly and positions of associated components with the flaperon deployed downward.

FIG. 16 shows the cam track assembly 38 and positions of associated components with the flaperon deployed downward. The runout areas 66 and 102 at the aft ends of the forward and aft cam surfaces 40 and 42 respectively each provide an allowance for obstructions.

3.7 Cam Shape and Clearance Provisions

The shape of the cam surfaces affects the potential for jamming. Another aspect of the forward cam surface 40 (see FIG. 4) is that it is predominantly vertical. With at least 70% of the forward cam surface vertically oriented, combined with the narrow cam surface width, the open design and the effect of gravity all contribute to prevent items from being lodged in the forward cam surface. In addition, any small object that would try to lodge between the bearing and the forward cam surface would tend to push the bearing against the opposite cam surface and would reverse the rotational direction of the bearing, subsequently ejecting the debris from the path of the bearing.

3.8 CRES Cam and Lubricated CRES Roller Bearing

Jam conditions occurring due to corrosion are unlikely. The cam surfaces are constructed from a solution-treated corrosion-resistant stainless steel. The roller bearing seated in the forward cam surface is a lubricated, sealed needle bearing. The needles and the races are made of corrosion-resistant stainless steel. Stainless is not subject to corrosion degradation. If the needles in the bearing fail, the mechanism will continue to operate jam-free since the roller will slide in the cam track or rotate about the outer diameter of the bearing within the housing in the link. Regular lubrication intervals will detect a seized bearing.

3.9 Aft Cam Shroud Feature

Figure 17:
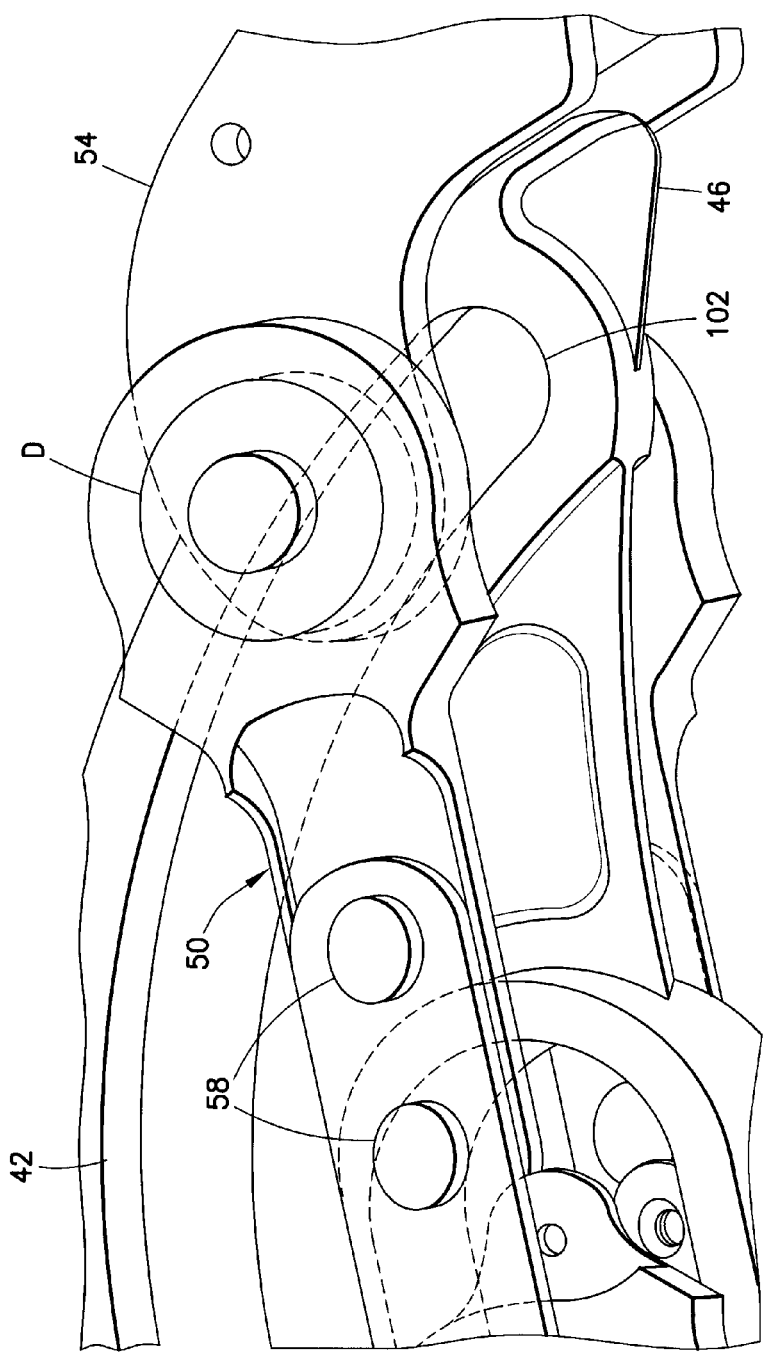
FIGS. 17 and 18 are diagrams showing isometric views (from different angles) of a cam surface having an external shroud feature in accordance with one embodiment.
Figure 18:
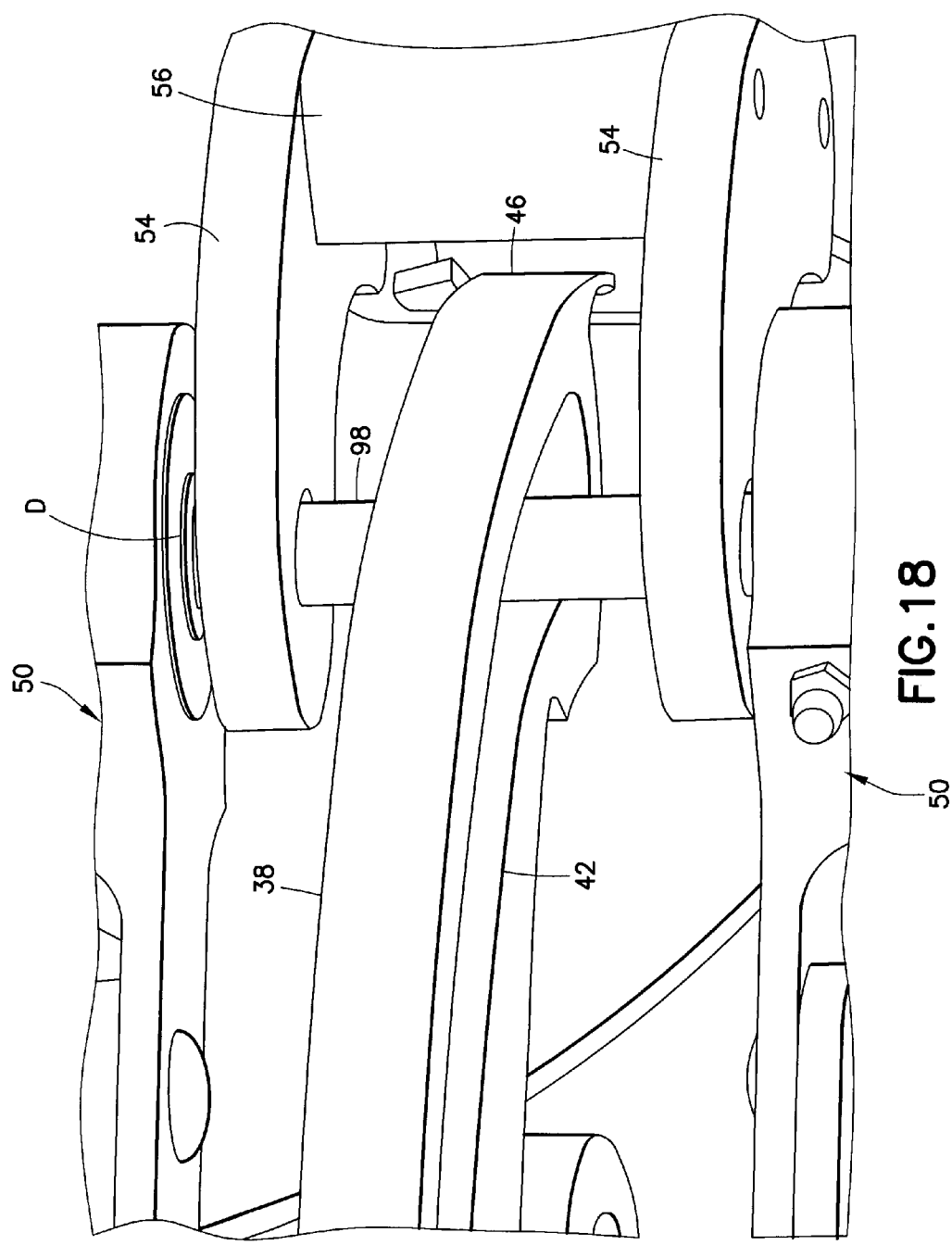

FIGS. 17 and 18 show isometric views (from different angles) of a cam track assembly 38 having an external cam shroud feature 46 at its aft end. The purpose of the shroud is to prevent an object from interfering between the external surface of the cam track assembly 38 and the clevis joint D containing the failsafe bushing (item 98 in FIG. 14). The presence of the extension 46 on the external surface of the cam track assembly assures that the area of the clevis is always occupied by either the shroud or the cam surface, thereby clearing away objects and protecting the area from debris lodging into the cam/clevis interface. In addition, the lower edges of the flaperon catcher plates 54 of the catcher fitting are shaped such that any object that is situated on top of the cam track assembly will be pushed by the flaperon catcher rib 56 rather than being trapped between the flaperon catcher rib 56 and the top of the cam track assembly.

3.10 Fastener Installation

As best seen in FIG. 18, fasteners installing the rigid hinged panel drive mechanism have dual retention features by the use of a self-locking castellated nut 104 with a cotter pin 106. The use of dual retention features on the fasteners not only ensures that the mechanism and joints stay fastened throughout the life of the airplane but also reduce the potential for any foreign objects to fall onto the cam surface.

The flaperon and rigid hinged panel mechanism described above has been designed to account for conditions where the mechanism encounters an obstruction and requires structural overload alleviation and also includes design features that prevent a jam from occurring. For the conditions where an obstruction in the cam surface could result in an overload to the rigid hinged panel mechanism, features have been included that will alleviate the structural overload condition in a manner that precludes structural components from departing the airplane, with the intact structure capable of reacting limit airloads. The alleviation is accomplished in a manner that does not result in any secondary failures that could contribute to unsafe secondary jams. The alleviation is considered as minor with regards to continued safe flight and landing and is detectable during lubrication or planned zonal inspection.

In addition, design attributes described above reduce the risk that the rigid hinged panel mechanism will become jammed. These features individually address specific defined jam scenarios and together successfully prevent any jam from occurring. Based on a qualitative assessment of the combined features, it is extremely improbable for a jam to occur outside of the areas where protection by structural alleviation has been provided. The features added in an effort to prevent the jam from occurring include: (a) enclosing the area of the cam surfaces with other ribs and panels and locating systems away from the cam surface; (b) allowing excessive clearance at either end of the cams; (c) optimizing the geometry; and (d) using corrosion-resistant materials.

While various embodiments have been described, it will be understood by those skilled in the art that various changes may be made and equivalents may be substituted for elements thereof without departing from the scope of the teachings herein. In addition, many modifications may be made to adapt a particular situation to those teachings without departing from the essential scope thereof. Therefore it is intended that scope of the claims set forth hereinafter not be limited to the disclosed embodiments.

The invention claimed is:

1. An apparatus comprising:
   first and second rotatable subassemblies respectively pivotably coupled to a support structure;
   a drive linkage which links the first rotatable subassembly to the second rotatable subassembly so that rotation of the first rotatable subassembly drives rotation of the second rotatable subassembly, the drive linkage comprising first and second links, a first joint which pivotably couples the first and second links to each other, and a second joint which pivotably couples the first link to the first rotatable subassembly;
   an actuator pivotably coupled to the support structure and to the first rotatable subassembly, the actuator when activated producing a force urging the first rotatable subassembly to rotate relative to the support structure; and
   a cam track structure mounted to the support structure, the cam track structure comprising first and second cam surfaces,
   wherein the first and second joints of the drive linkage are trapped in the first and second cam surfaces respectively of the cam track structure, and wherein at least one of the first and second links comprises a weakened portion which is designed to fail when a structural overload is produced due to jamming.

2. The apparatus as recited in claim 1, wherein said weakened portion comprises a fusing fastener which is designed to shear when an overload is generated due to jamming.

3. The apparatus as recited in claim 1, wherein the first cam surface has runout regions at respective ends thereof.

4. The apparatus as recited in claim 1, wherein the cam track structure is made of corrosion-resistant material.

5. The apparatus as recited in claim 1, wherein the support structure comprises an airfoil-shaped body, the first rotatable subassembly comprises a flap, and the second rotatable subassembly comprises a panel.

6. The apparatus as recited in claim 1, wherein the first rotatable subassembly comprises a rib and a pair of plates attached to the rib by fasteners, and the second joint of the drive linkage pivotably couples the first link to the plates.

7. The apparatus as recited in claim 6, wherein the cam track structure comprises a shroud feature that extends into a space between the plates.

8. The apparatus as recited in claim 6, wherein the fasteners which fasten the plates to the rib are designed to shear when a structural overload is produced due to jamming.

9. The apparatus as recited in claim 1, wherein the first link comprises an extended rub plate attachment tab, further comprising a rub plate attached to the extended rub plate attachment plate and in contact with the cam track structure adjacent the first cam surface.

10. The apparatus as recited in claim 1, wherein the drive linkage further comprise a fastener and first and second fastener retention means which independently retain the fastener in place.

11. An apparatus comprising:
    first and second rotatable subassemblies respectively pivotably coupled to a support structure;
    a drive linkage which links the first rotatable subassembly to the second rotatable subassembly so that rotation of the first rotatable subassembly drives rotation of the second rotatable subassembly, the drive linkage comprising first and second links, a first joint which pivotably couples the first and second links to each other, and a second joint which pivotably couples the first link to the first rotatable subassembly;
    an actuator pivotably coupled to the support structure and to the first rotatable subassembly, the actuator when activated producing a force urging the first rotatable subassembly to rotate relative to the support structure; and
    a cam track structure mounted to the support structure, the cam track structure comprising first and second cam surfaces, wherein the first and second joints of the drive linkage are trapped in the first and second cam surfaces respectively of the cam track structure,
    wherein at least one of the first and second joints comprises a roller bearing comprising crowned rollers which are narrower than the width of the cam surface.

12. The apparatus as recited in claim 11, further comprising means for alleviating a structural overload due to jamming.

13. The apparatus as recited in claim 11, wherein at least one of the first and second links comprises first and second link segments fastened together by a fusing fastener that is designed to shear when an overload is generated due to jamming.

14. The apparatus as recited in claim 11, wherein the support structure comprises an airfoil-shaped body, the first rotatable subassembly comprises a flap, and the second rotatable subassembly comprises a panel.

15. The apparatus as recited in claim 11, wherein the cam surface and the crown roller are made of corrosion-resistant steel.

16. An apparatus comprising:
first and second rotatable subassemblies respectively pivotably coupled to a support structure;
a drive linkage which links the first rotatable subassembly to the second rotatable subassembly so that rotation of the first rotatable subassembly drives rotation of the second rotatable subassembly, the drive linkage comprising first and second links, a first joint which pivotably couples the first and second links to each other, and a second joint which pivotably couples the first link to the first rotatable subassembly;
an actuator pivotably coupled to the support structure and to the first rotatable subassembly, the actuator when activated producing a force urging the first rotatable subassembly to rotate relative to the support structure; and
a cam track structure mounted to the support structure, the cam track structure comprising first and second cam surfaces, wherein the first and second joints of the drive linkage are trapped in the first and second cam surfaces respectively of the cam track structure,
wherein extra run-out space is provided at both ends of the first and second cam surfaces.

17. The apparatus as recited in claim 16, wherein the first rotatable subassembly comprises a rib and a pair of plates attached to the rib by fasteners, the second joint of the drive linkage pivotably couples the first link to the plates, and the cam track structure comprises a shroud feature that extends into a space between the plates.

18. The apparatus as recited in claim 16, wherein at least one of the first and second links comprises first and second link segments fastened together by a fusing fastener that is designed to shear when an overload is generated due to jamming.

19. An apparatus comprising:
first and second rotatable subassemblies respectively pivotably coupled to a support structure;
a drive linkage which links the first rotatable subassembly to the second rotatable subassembly so that rotation of the first rotatable subassembly drives rotation of the second rotatable subassembly, the drive linkage comprising first and second links, a first joint which pivotably couples the first and second links to each other, and a second joint which pivotably couples the first link to the first rotatable subassembly, wherein the first link comprises an extended rub plate attachment tab;
an actuator pivotably coupled to the support structure and to the first rotatable subassembly, the actuator when activated producing a force urging the first rotatable subassembly to rotate relative to the support structure;
a cam track structure mounted to the support structure, the cam track structure comprising first and second cam surfaces, wherein the first and second joints of the drive linkage are trapped in the first and second cam surfaces respectively of the cam track structure; and
a rub plate attached to the extended rub plate attachment plate and in contact with the cam track structure adjacent the first cam surface.

20. The apparatus as recited in claim 19, wherein the rub plate attachment tab extends to include shroud features which prevent an object from becoming trapped between said rub plate attachment tab and the first cam surface during rotation of said first link about said first joint.

* * * * *